US007366319B2

(12) United States Patent
Andrew et al.

(10) Patent No.: US 7,366,319 B2
(45) Date of Patent: Apr. 29, 2008

(54) EMBEDDING A MULTI-RESOLUTION COMPRESSED THUMBNAIL IMAGE IN A COMPRESSED IMAGE FILE

(75) Inventors: James Philip Andrew, Waverton (AU); Peter Reeve Foster, Macquarie Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 801 days.

(21) Appl. No.: 10/448,284

(22) Filed: May 30, 2003

(65) Prior Publication Data

US 2004/0032968 A1 Feb. 19, 2004

(30) Foreign Application Priority Data

May 31, 2002 (AU) .................................. PS2710

(51) Int. Cl.
*G06K 9/00* (2006.01)
(52) U.S. Cl. ..................... 382/100; 382/232; 341/56; 358/539
(58) Field of Classification Search ................ 382/100, 382/232–253, 276, 284, 289; 341/3, 9, 51, 341/56; 358/539
See application file for complete search history.

(56) References Cited

U.S. PATENT DOCUMENTS

| | | | | |
|---|---|---|---|---|
| 5,414,527 A * | 5/1995 | Koshi et al. | ................. | 382/239 |
| 5,867,602 A * | 2/1999 | Zandi et al. | ................. | 382/248 |
| 6,246,798 B1 | 6/2001 | Andrew et al. | ............. | 382/240 |
| 6,259,819 B1 | 7/2001 | Andrew et al. | ............. | 382/248 |
| 6,263,110 B1 | 7/2001 | Andrew et al. | ............. | 382/232 |
| 6,266,414 B1 | 7/2001 | Bradley et al. | ............. | 380/240 |
| 6,351,568 B1 | 2/2002 | Andrew | ...................... | 382/239 |
| 6,389,074 B1 | 5/2002 | Andrew | ................ | 375/240.05 |
| 6,421,467 B1 * | 7/2002 | Mitra | ......................... | 382/240 |
| 6,570,510 B2 | 5/2003 | Chen et al. | ................... | 341/51 |
| 6,804,403 B1 * | 10/2004 | Wang et al. | ................. | 382/240 |
| 7,095,907 B1 * | 8/2006 | Berkner et al. | ............. | 382/298 |
| 2002/0051583 A1 | 5/2002 | Brown et al. | ............... | 382/299 |
| 2002/0131084 A1 | 9/2002 | Andrew et al. | ............ | 358/1.16 |
| 2003/0031370 A1 | 2/2003 | Andrew | ..................... | 382/233 |
| 2003/0063809 A1 | 4/2003 | Andrew | ..................... | 382/240 |

FOREIGN PATENT DOCUMENTS

WO WO99/53429 A1 10/1999

OTHER PUBLICATIONS

W. Pennebaker et al., JPEG: Still Image Data Compression Standard, Van Nostrand Reinhold, 1993.

* cited by examiner

*Primary Examiner*—Samir Ahmed
*Assistant Examiner*—Anand Bhatnagar
(74) *Attorney, Agent, or Firm*—Fitzpatrick, Cella, Harper & Scinto

(57) ABSTRACT

A method (300) of encoding an image into an image code-stream. The method (300) generates a reduced resolution representation of the image and encodes the reduced resolution representation in accordance with a multi-resolution format to form an encoded reduced resolution representation of the image. The encoded reduced resolution representation is embedded into a first portion of the image code-stream and a compressed representation of the image is encoded into a further portion of the image code-stream.

10 Claims, 13 Drawing Sheets

EMBEDDING A MULTI-RESOLUTION COMPRESSED THUMBNAIL IMAGE IN A COMPRESSED IMAGE FILE

FIELD OF THE INVENTION

The present invention relates generally to the field of digital image compression and, in particular, to a method of encoding a compressed thumbnail image into a compressed image code-stream. The present invention also relates to a computer program product including a computer readable medium having recorded thereon a computer program for encoding a compressed thumbnail image into a compressed image code-stream.

BACKGROUND

Digital images can be captured, stored, manipulated and/or displayed on many devices, including general purpose computers, digital still cameras and digital video cameras. On many such devices a user can select an image or set of images for display on the particular device. In order to meet the viewing conditions of a particular device, images are often displayed in different sizes (or resolutions) and typically in sizes less than the size of a corresponding original image.

Digital images are typically stored in a compressed format on devices in order to reduce storage, memory and bandwidth costs. A widely used standard for image compression is the "Joint Photographic Experts Group (JPEG)" standard, for image compression. The JPEG standard comprises many variations based on a common compression scheme. The most widely used of the JPEG compression schemes is referred to as "JPEG baseline mode". However, other less popular modes, are available under the JPEG standard. One of these less popular modes of compression is referred to as "spectral selection mode". Spectral selection mode allows for encoding, and subsequent decoding, of an image using several scans through the image. A detailed description of each of the JPEG standards discussed above can be found in a publication entitled "JPEG: Still Image Data Compression Standard", by W. B. Pennebaker and J. L. Mitchell, published in 1993 by Van Nostrand Reinhold publishers, hereinafter referred to as Pennebaker et al.

Computer browsing applications typically display many small representations of a set of images called "thumbnail images" or "thumbnails". Typically many such thumbnails can be displayed on a device at one time. As such, the time required to display a thumbnail image (i.e. the "display time") and hence the time required to decompress a stored thumbnail image (i.e. the "decode time"), is extremely important to the users of the devices discussed above.

Different size representations of an image can be generated by decoding a corresponding full-size compressed version of the image and then sub-sampling the decoded image to a desired size. Whilst such methods can provide good compression of images, particularly for a large collection of images, the display of images compressed according to such methods is extremely slow and therefore undesirable even when using modern computer processing devices.

Accordingly, other methods have been developed in order to speed-up decoding of image data at a reduced size (or reduced resolution) for baseline JPEG images. Such other methods are employed, for example, in source code produced by a group known as the Independent JPEG Group (IJG). However, any increase in the decoding speed achieved through using these other methods is often insufficient for many applications. Another known method for providing different size (or resolution) representations of an image is based on the storage of multiple resolutions of a particular image as a set of images, and then independent compression of each resolution according to the JPEG compression standard. Such a method is utilized by the FlashPix™ format, for example, as known to those in the relevant art. in order to decode image data using such a method, a desired resolution can be selected for the encoded images and then the images are decoded accordingly. Whilst storing multiple resolutions of a particular image as a set of images is relatively fast there are a number of disadvantages. Firstly, since multiple sizes of each image need to be stored, some of the image data is redundant. Such a problem is particularly prevalent when a typical dyadic range of resolutions are stored (i.e. 1, ½, ¼ etc, times smaller than the original image in each dimension). Secondly, storing multiple versions of each image, albeit of different sizes, impacts unfavourably on the compression ratio between a compressed and an uncompressed image. Thirdly, having several images representing one image can result in a number of data management problems.

Still another known method for providing different size images is based on the embedding of a thumbnail version of an image in a compressed image code-stream. Such a method is utilized for example in the 'Exif' image format, as known to those in the relevant art, and as widely used in digital still cameras. A thumbnail image stored in an Exif image is often used when displaying the image. In such a method, only the thumbnail image is decoded to provide a small representation (low resolution) representation of the image. Decoding the thumbnail is substantially faster than decoding a full size compressed image and then down-sampling to the desired size. However, the thumbnail can only be decoded efficiently at its original or native size. The decoding speed is still too slow for many applications that require a thumbnail to be decoded at lower resolutions. In particular, the time taken to decode the thumbnail at a size that is eight times smaller in each dimension, for example, to provide an iconic version of the image, is far less than desirable for some applications.

There are a number of known non-redundant hierarchical or multi-resolution image representations that allow relatively fast multi-resolution decoding, such as discrete wavelet transform (DWT) based compression methods, which can be used for decoding images relatively quickly at variable sizes. An image compressed in accordance with the "Joint Photographic Experts Group 2000 (JPEG 2000)" image compression standard for image compression, is an example of one such image representation. However, with JPEG2000 and other wavelet based compression methods, there are no guarantees on the size of the lowest resolution image that can be decoded efficiently, and further there is no guarantee that even such a lowest resolution image can itself be decoded efficiently. For instance, some JPEG2000 images are unable to be decoded fast enough for applications that desire multiple size decoding.

SUMMARY

It is an object of the present invention to substantially overcome, or at least ameliorate, one or more disadvantages of existing arrangements.

According to a first aspect of the present disclosure, there is provided a method of encoding an image into an image code-stream, said method comprising the steps of:

generating a reduced resolution representation of said image;

encoding said reduced resolution representation in accordance with a multi-resolution format to form an encoded reduced resolution representation of said image;

embedding said encoded reduced resolution representation into a first portion of said image code-stream; and encoding a compressed representation of said image into a further portion of said image code-stream.

According to another aspect of the present disclosure, there is provided a method of compressing a primary image into a compressed primary image code-stream, the method comprising the steps of:

generating a thumbnail representation of said primary image;

compressing said thumbnail representation in accordance with a multi-resolution compressed format to form a compressed thumbnail image code-stream;

embedding said compressed thumbnail image code-stream into a first portion of said compressed primary image code-stream.; and compressing said primary image and encoding said compressed primary representation in a further portion of said compressed primary image code-stream.

According to another aspect of the present disclosure, there is provided a method of decoding a reduced resolution representation of an image, said reduced resolution representation being embedded in an image code-stream as an encoded reduced resolution representation in a multiresolution format, said method comprising the steps of:

determining a resolution for decoding said reduced resolution representation;

determining a location of said reduced resolution representation within said image code-stream; and decoding a portion of said reduced resolution representation at said location in accordance with the decoding resolution.

According to another aspect of the present disclosure, there is provided a method of decoding a compressed thumbnail image, said compressed thumbnail image being embedded in a compressed primary image code-stream as a compressed thumbnail code-stream in a compressed multi-resolution format, said method comprising the steps of:

determining a resolution for decoding said thumbnail compressed image in accordance with said compressed multiresolution format;

determining a location of said compressed thumbnail code-stream in said compressed primary image code-stream; and decoding a portion of said compressed thumbnail code-stream at said location in accordance with said resolution.

According to another aspect of the present disclosure, there is provided a method of decoding a set of compressed thumbnail images, each of said compressed thumbnail images being embedded in a compressed primary image code-stream as a compressed thumbnail code-stream, wherein each of said compressed thumbnail code-streams is in a compressed multiresolution format, said method comprising the steps of:

for each thumbnail image of said set of thumbnail images,
determining a decoding resolution;
determining a location of a thumbnail code-stream corresponding to said thumbnail image in said compressed primary image code-stream;
decoding a portion of said thumbnail code-stream at said location in accordance with said decoding resolution.

According to another aspect of the present disclosure, there is provided a method of decoding a thumbnail image, said thumbnail image being represented as a coded image code-stream embedded in a primary image code-stream, said coded image code-stream being encoded using a $2^k \times 2^k$ block size discrete cosine transform (DCT), said method comprising the steps of:

determining a desired resolution, j, for said image;

decoding a predetermined number of coefficients of said coded image code-stream in accordance with said desired resolution;

constructing $2^j \times 2^j$ blocks of image data from substantially all of said decoded coefficients corresponding to a top left hand corner sub-block of each of said $2^k \times 2^k$ blocks of DCT coefficients; and dequantizing, inverse discrete cosine transforming, and scaling each $2^j \times 2^j$ block of image data to decode said image.

According to another aspect of the present disclosure, there is provided a method of decoding an image, said image comprising a plurality of blocks, said blocks being encoded in an image code-stream in accordance with a spectral selection mode of JPEG compression standard, the encoded image code-stream being embedded in a primary image codestream, said method comprising the steps of:

determining a resolution (j);

decoding selected coefficients of each block of said encoded image codestream, for each of j scans;

retaining at least a portion of the decoded coefficients, said retained coefficients forming a sub-block of each block;

constructing said plurality of sub-blocks from said retained coefficients, each sub-block being characterised by a block size of $2^j \times 2^j$;

dequantizing, inverse discrete cosine transforming, and scaling each said sub-block, wherein each sub-block provides a portion of the decode image; and concatenating each of said portions to decode said image.

According to another aspect of the present disclosure, there is provided a method of transcoding a compressed thumbnail image representation embedded in a primary image code-stream, said method comprising the steps of:

accessing data corresponding to said compressed thumbnail image representation, entropy decoding said data;

entropy encoding said decoded data to form a compressed multi-resolution format representation; and replacing said thumbnail image compressed representation in said primary image code-stream with said compressed multi-resolution format representation.

According to another aspect of the present disclosure, there is provided an apparatus for encoding an image into an image code-stream, said apparatus comprising:

generating means for generating a reduced resolution representation of said image;

first encoding means for encoding said reduced resolution representation in accordance with a multi-resolution format to form an encoded reduced resolution representation of said image;

embedding means for embedding said encoded reduced resolution representation into a first portion of said image code-stream; and second encoding means for encoding a compressed representation of said image into a further portion of said image code-stream.

According to another aspect of the present disclosure, there is provided an apparatus for compressing a primary image into a compressed primary image code-stream, said apparatus comprising:

generating means for generating a thumbnail representation of said primary image;

first compressing means for compressing said thumbnail representation in accordance with a multi-resolution compressed format to form a compressed thumbnail image code-stream;

embedding means for embedding said compressed thumbnail image code-stream into a first portion of said compressed primary image code-stream.; and second compressing means for compressing said primary image and encoding said compressed primary representation in a further portion of said compressed primary image code-stream.

According to another aspect of the present disclosure, there is provided an apparatus for decoding a compressed thumbnail image, said compressed thumbnail image being embedded in a compressed primary image code-stream as a compressed thumbnail code-stream in a compressed multi-resolution format, said apparatus;

processor means for determining a resolution for decoding said thumbnail compressed image in accordance with said compressed multiresolution format, and determining a location of said compressed thumbnail code-stream in said compressed primary image code-stream; and decoding means for decoding a portion of said compressed thumbnail code-stream at said location in accordance with said resolution.

According to another aspect of the present disclosure, there is provided an apparatus for decoding a set of compressed thumbnail images, each of said compressed thumbnail images being embedded in a compressed primary image code-stream as a compressed thumbnail code-stream wherein each of said compressed thumbnail code-streams is in a compressed multiresolution format, said apparatus comprising:

processor means for determining a size for displaying said thumbnail images; and for each thumbnail image of said set of thumbnail images,
determining a decoding resolution according to said size;
determining a location of a thumbnail code-stream corresponding to said thumbnail image in said compressed primary image code-stream;
decoding a portion of said thumbnail code-stream at said location in accordance with said decoding resolution.

According to another aspect of the present disclosure, there is provided an apparatus for decoding a thumbnail image, said thumbnail image being represented as a coded image code-stream embedded in a primary image code-stream, said coded image code-stream being encoded using a $2^k \times 2^k$ block size discrete cosine transform (DCT), said apparatus comprising:

determining means for determining a desired resolution, j, for said image;

decoding means for decoding a predetermined number of coefficients of said coded image code-stream in accordance with said desired resolution;

constructing means for constructing $2^j \times 2^j$ blocks of image data from substantially all of said decoded coefficients corresponding to a top left hand corner sub-block of each of said $2^k \times 2^k$ blocks of DCT coefficients; and means for dequantizing, inverse discrete cosine transforming, and scaling each $2^j \times 2^j$ block of image data to decode said image.

According to another aspect of the present disclosure, there is provided an apparatus for decoding an image, said image comprising a plurality of blocks, said blocks being encoded in an image code-stream in accordance with a spectral selection mode of JPEG compression standard, the encoded image code-stream being embedded in a primary image codestream, said apparatus comprising:

resolution determining means for determining a resolution (j);

decoding means for decoding selected coefficients of each block of said encoded image codestream, for each of j scans;

storage means for retaining at least a portion of the decoded coefficients, said retained coefficients forming a sub-block of each block;

processor means for constructing said plurality of sub-blocks from said retained coefficients, each sub-block being characterised by a block size of $2^j \times 2^j$, and for dequantizing, inverse discrete cosine transforming, and scaling each said sub-block, wherein each sub-block provides a portion of the decode image; and concatenating means for concatenating each of said portions to decode said image.

According to another aspect of the present disclosure, there is provided an apparatus for transcoding a compressed thumbnail image representation embedded in a primary image code-stream, said apparatus comprising:

accessing means for accessing data corresponding to said compressed thumbnail image representation;

decoding means for entropy decoding said data;

encoding means for entropy encoding said decoded data to form a compressed multi-resolution format representation; and thumbnail image replacing means for replacing said thumbnail image compressed representation in said primary image code-stream with said compressed multi-resolution format representation.

According to another aspect of the present disclosure, there is provided a program for encoding an image into an image code-stream, said program comprising:

code for generating a reduced resolution representation of said image;

code for encoding said reduced resolution representation in accordance with a multi-resolution format to form an encoded reduced resolution representation of said image;

code for embedding said encoded reduced resolution representation into a first portion of said image code-stream; and code for encoding a compressed representation of said image into a further portion of said image code-stream.

According to another aspect of the present disclosure, there is provided a program for compressing a primary image into a compressed primary image code-stream, the program comprising:

code for generating a thumbnail representation of said primary image;

code for compressing said thumbnail representation in accordance with a multi-resolution compressed format to form a compressed thumbnail image code-stream;

code for embedding said compressed thumbnail image code-stream into a fast portion of said compressed primary image code-stream.; and code for compressing said primary image and encoding said compressed primary representation in a further portion of said compressed primary image code-stream.

According to another aspect of the present disclosure, there is provided a program for decoding a reduced resolution representation of an image, said reduced resolution representation being embedded in an image code-stream as an encoded reduced resolution representation in a multiresolution format, said program comprising:

code for determining a resolution for decoding said reduced resolution representation;

code for determining a location of said reduced resolution representation within said image code-stream; and code for decoding a portion of said reduced resolution representation at said location in accordance with the decoding resolution.

According to another aspect of the present disclosure, there is provided a program for decoding a compressed thumbnail image, said compressed thumbnail image being embedded in a compressed primary image code-stream as a compressed thumbnail code-stream in a compressed multi-resolution format, said program comprising:

code for determining a resolution for decoding said thumbnail compressed image in accordance with said compressed multiresolution format;

code for determining a location of said compressed thumbnail code-stream in said compressed primary image code-stream; and code for decoding a portion of said compressed thumbnail code-stream at said location in accordance with said resolution.

According to another aspect of the present disclosure, there is provided a program for decoding a set of compressed thumbnail images, each of said compressed thumbnail images being embedded in a compressed primary image code-stream as a compressed thumbnail code-stream, wherein each of said compressed thumbnail code-streams is in a compressed multiresolution format, said program comprising code for performing the following steps:

for each thumbnail image of said set of thumbnail images,
determining a decoding resolution;
determining a location of a thumbnail code-stream corresponding to said thumbnail image in said compressed primary image code-stream;
decoding a portion of said thumbnail code-stream at said location in accordance with said decoding resolution.

According to another aspect of the present disclosure, there is provided a program for decoding a thumbnail image, said thumbnail image being represented as a coded image code-stream embedded in a primary image codestream, said coded image code-stream being encoded using a $2^k \times 2^k$ block size discrete cosine transform (DCT), said program comprising:

code for determining a desired resolution, j, for said image;

code for decoding a predetermined number of coefficients of said coded image code-stream in accordance with said desired resolution;

code for constructing $2^j \times 2^j$ blocks of image data from substantially all of said decoded coefficients corresponding to a top left hand corner sub-block of each of said $2^k \times 2^k$ blocks of DCT coefficients; and code for dequantizing, inverse discrete cosine transforming, and scaling each $2^j \times 2^j$ block of image data to decode said image.

According to another aspect of the present disclosure, there is provided a program for decoding an image, said image comprising a plurality of blocks, said blocks being encoded in an image code-stream in accordance with a spectral selection mode of JPEG compression standard, the encoded image code-stream being embedded in a primary image codestream, said program comprising:

code for determining a resolution (j);

code for decoding selected coefficients of each block of said encoded image codestream, for each of j scans;

code for retaining at least a portion of the decoded coefficients, said retained coefficients forming a sub-block of each block;

code for constructing said plurality of sub-blocks from said retained coefficients, each sub-block being characterised by a block size of $2^j \times 2^j$;

code for dequantizing, inverse discrete cosine transforming, and scaling each said sub-block, wherein each sub-block provides a portion of the decode image; and code for concatenating each of said portions to decode said image.

According to another aspect of the present disclosure, there is provided a program for transcoding a compressed thumbnail image representation embedded in a primary image code-stream, said program comprising:

code for accessing data corresponding to said compressed thumbnail image representation;

code for entropy decoding said data;

code for entropy encoding said decoded data to form a compressed multi-resolution format representation; and code for replacing said thumbnail image compressed representation in said primary image code-stream with said compressed multi-resolution format representation.

According to another aspect of the present disclosure, there is provided a method of encoding an image into an image code-stream, said method comprising the steps of:

generating a reduced resolution representation of said image;

encoding said reduced resolution representation to form an encoded reduced resolution representation of the image, said encoded reduced resolution representation comprising a plurality of resolutions (non-redundant) efficient multi-resolution format, each resolution of said format being adapted to decode in a time substantially proportional to the number of pixels of the decoded resolution;

embedding said encoded reduced resolution representation into a portion of said image code-stream; and encoding a compressed representation of said image into a further portion of said image code-stream, wherein the decode time of said compressed representation is greater than the decode time of a resolution from said encoded reduced resolution representation.

According to another aspect of the present disclosure, there is provided an apparatus for encoding an image into an image code-stream, said apparatus comprising:

generation means for generating a reduced resolution representation of said image;

encoding means for encoding said reduced resolution representation to form an encoded reduced resolution representation of the image, said encoded reduced resolution representation comprising a plurality of resolutions (non-redundant) efficient multi-resolution format, each resolution of said format being adapted to decode in a time substantially proportional to the number of pixels of the decoded resolution;

embedding means for embedding said encoded reduced resolution representation into a portion of said image code-stream; and encoding means for encoding a compressed representation of said image into a further portion of said image code-stream, wherein the decode time of said compressed representation is greater than the decode time of a resolution from said encoded reduced resolution representation.

According to another aspect of the present disclosure, there is provided a program for encoding an image into an image code-stream, said program comprising:

code for generating a reduced resolution representation of said image;

code for encoding said reduced resolution representation to form an encoded reduced resolution representation of the image, said encoded reduced resolution representation comprising a plurality of resolutions (non-redundant) efficient multi-resolution format, each resolution of said format being adapted to decode in a time substantially proportional to the number of pixels of the decoded resolution;

code for embedding said encoded reduced resolution representation into a portion of said image code-stream; and code for encoding a compressed representation of said image into a further portion of said image code-stream, wherein the decode time of said compressed representation is greater than the decode time of a resolution from said encoded reduced resolution representation.

According to another aspect of the present disclosure, there is provided a method of decoding a plurality of thumbnail images from a plurality of corresponding image code-streams, each image code-stream having a thumbnail portion comprising a non-redundant multi-resolution thumbnail image and a further portion comprising a compressed representation of a full size image represented by said multi-resolution thumbnail image, the method comprising the steps of:

extracting and decoding data from the thumbnail portion of each of said plurality of image code-streams to decode at least one resolution of the multi-resolution thumbnail image from each of said plurality of code-streams, wherein each of said at least one resolutions is adapted for decoding in a time substantially proportional to the size of the thumbnail image decoded.

According to another aspect of the present disclosure, there is provided an apparatus for decoding a plurality of thumbnail images from a plurality of corresponding image code-streams, each image code-stream having a thumbnail portion comprising a non-redundant multi-resolution thumbnail image and a further portion comprising a compressed representation of a full size image represented by said multi-resolution thumbnail image, the apparatus comprising:

extraction and decoding means for extracting and decoding data from the thumbnail portion of each of said plurality of image code-streams to decode at least one resolution of the multi-resolution thumbnail image from each of said plurality of code-streams, wherein each of said at least one resolutions is adapted for decoding in a time substantially proportional to the size of the thumbnail image decoded.

According to another aspect of the present disclosure, there is provided a program for decoding a plurality of thumbnail images from a plurality of corresponding image code-streams, each image code-stream having a thumbnail portion comprising a non-redundant multi-resolution thumbnail image and a further portion comprising a compressed representation of a full size image represented by said multi-resolution thumbnail image, the program comprising:

code for extracting and decoding data from the thumbnail portion of each of said plurality of image code-streams to decode at least one resolution of the multi-resolution thumbnail image from each of said plurality of code-streams, wherein each of said at least one resolutions is adapted for decoding in a time substantially proportional to the size of the thumbnail image decoded.

BRIEF DESCRIPTION OF THE DRAWINGS

One or more embodiments of the present invention will now be described with reference to the drawings and appendices, in which.

Figure 13:
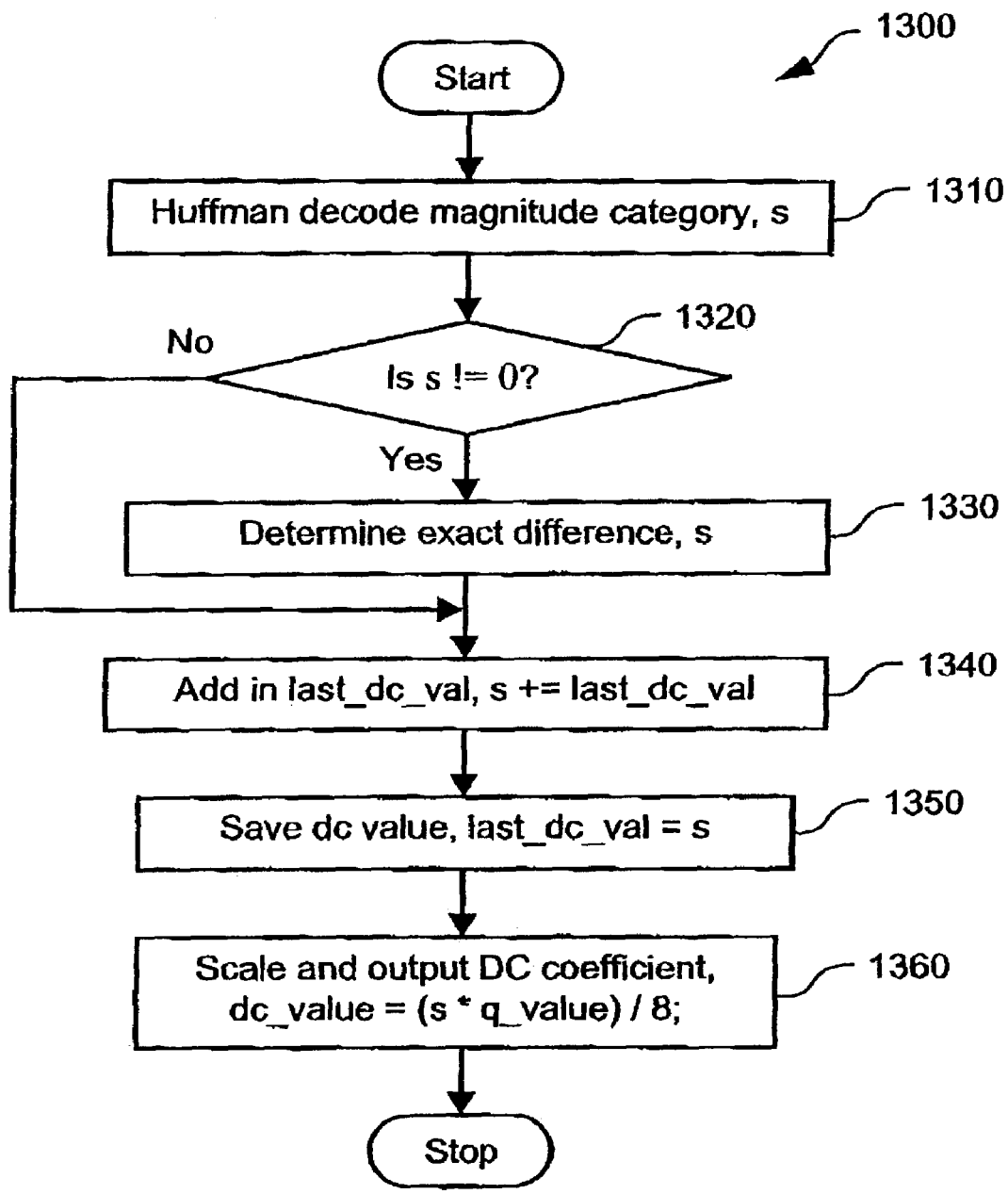
FIG. 13 is a flow diagram showing a method of decoding a DC coefficient for a code-stream.
Figure 14:
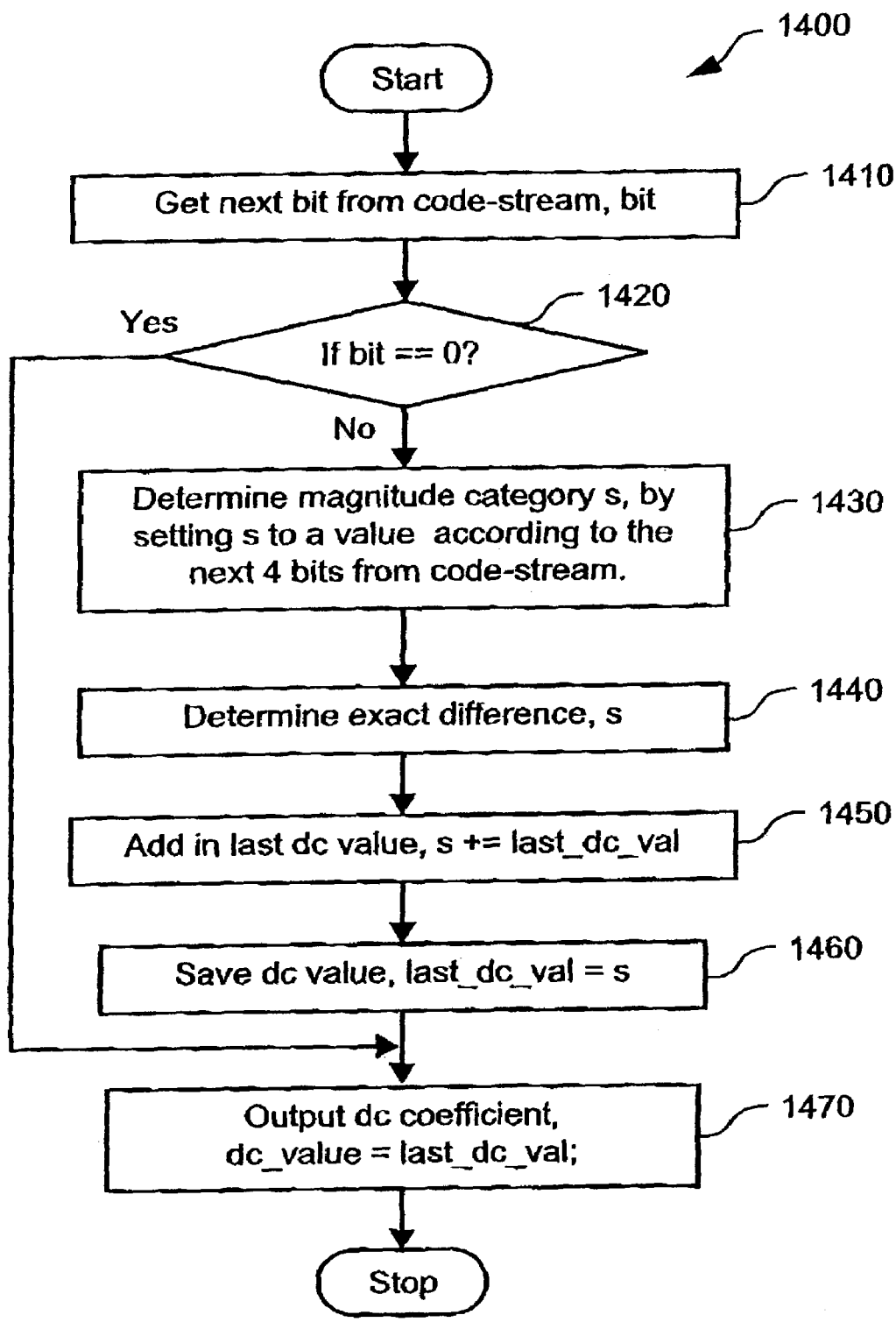
FIG. 14 is a flow diagram showing another method of decoding a DC coefficient for a code-steam.

Appendix A shows a software-code (i.e., C-code) listing for one implementation of the method of FIG. 13; and Appendix B shows a software-code (i.e., C-code) listing for one implementation of the method of FIG. 14.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of documents or devices, which form public knowledge through their respective publication and/or use. Such should not be interpreted as a representation by the present inventor or patent applicant that such documents or devices in any way form part of the common general knowledge in the art.

For many computer applications fast decoding of images at variable sizes (i.e., resolutions) is desirable. One such application includes image database browsing (e.g. still image data libraries and/or video image data libraries), in which a plurality of images are stored in a database typically in a compressed or encoded format (e.g. the JPEG compression format), to reduce a computer system memory and/or permanent storage requirements. Typically, a user of a browser application can view a large collection of images at once. In order to allow the display of a large collection of images at once on one display screen, the size of each image needs to be relatively small (i.e., at low resolution). As another example, the user of a browser application may be interested in viewing more detail for a small subset of a larger collection of images, where the relative resolution or size of the displayed images is larger. As still another example, the user may wish to view a single image in as much detail as is available for a large size image. In order to account for these different requirements, each image of the collection of images needs to be displayable at different resolutions in order to provide different image browsing sizes, respectively.

The time taken to display a compressed image on a given computer system is often bound by two factors. The first and usually the most significant factor, is the time taken to decompress the image. The second factor is the time taken to find and read the compressed image data off a storage device (e.g. a hard disk) of the computer system. The time to find the compressed image data is generally referred to as the "seek time", while the time to read the compressed image data is generally referred to as the "read time".

Being able to decode an image in a time that is approximately proportional to the size of the decoded image, independent of the size of the original compressed image facilitates fast and efficient image display. Further, if the decode time for the full size image compares well against a comparable compression method, then such a decode property is particularly desirable. For example, in the case of JPEG compressed images, the decode time for a baseline JPEG compressed image can be considered as a benchmark time for a corresponding full size image. Thus, if a full size image is decoded from a baseline JPEG image in one second, it is advantageous to be able to decode the full size image at ½, ¼ and ⅛ the size in both dimensions in a time of ¼, ¹⁄₁₆ and ¹⁄₆₄ seconds, respectively. A compressed image that can be decoded in such a manner is referred to herein as an "Efficient Multi-resolution Format Image" and is deemed to possess an efficient multi-resolution decoding property, unless otherwise indicated, In the case of JPEG2000 compressed images, the JPEG2000 decompression time for a full size image can be considered as a suitable benchmark time.

Many image compression methods employ a transform including an inter-component transform (e.g. a colour transform) and an intra-component transform (e.g. a Discrete Cosine Transform (DCT)), quantization and entropy coding modules. The corresponding decompression transform employs entropy decoding, dequantization, and inverse transform modules For such compression methods the decode time is dependent on the processing time for each module. The processing time for the entropy decoding module depends to a significant degree on the number of data points entropy decoded (including any data points that may be entropy decoded, but discarded in the final output). Similarly the time taken to do the inverse transform (including dequantization) is substantially dependent on the number of data points transformed, Thus, to achieve a decoding time that is proportional to the decoded image size, it is preferable to entropy decode substantially only the same number of data points (e.g. DCT coefficients) as there are pixels in the decompressed image (not counting down/up sampling associated with the colour transform) Further, in order to minimize the effect of seek and read times on storage devices, the data that is read for a given resolution is preferably stored in one contiguous segment in a compressed image code-stream, or as a minimal number of segments.

Figure 1:
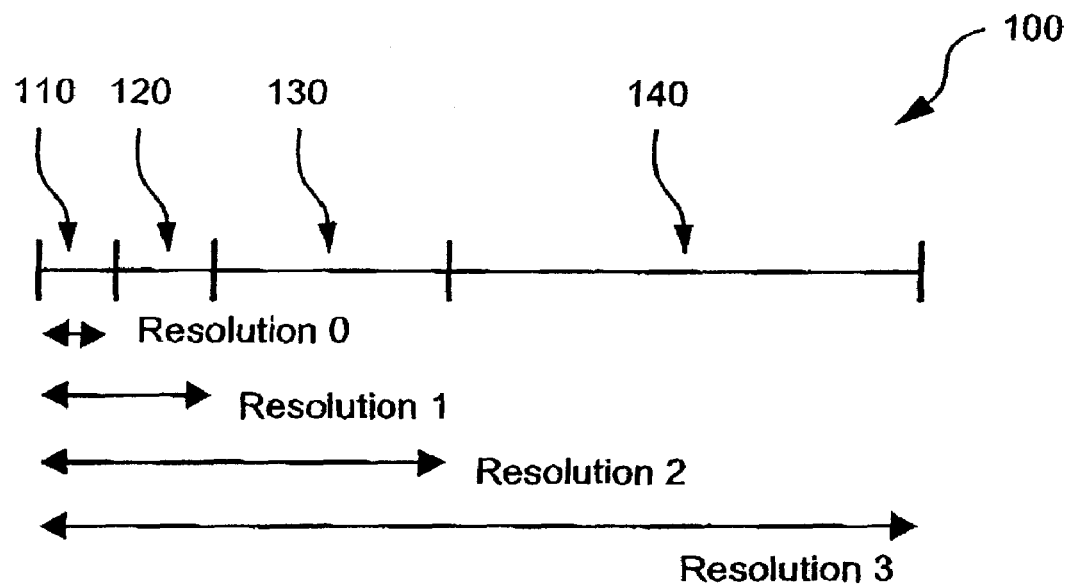
FIG. 1 shows a representation of a compressed image code-stream in a multi-resolution format.

An image (not shown) encoded as a compressed image code-stream 100 in a multi-resolution format, in accordance with one example of such a multi-resolution format, is shown in FIG. 1. The image of FIG. 1 has an associated decoding time that is proportional to the size of the decoded image (not shown), as described above. The compressed image code-stream 100 representing the image is a contiguous sequence of data (e.g. bytes). Data representing a lowest resolution (i.e. resolution 0) of the image comprises a first portion 110 of the code-stream 100. Data representing the next lowest resolution, (i.e. resolution 1), comprises the first portion 110 and a next portion 120 of the code-stream 100. Similarly, data representing the next lowest resolution, (i.e. resolution 2), comprises the first portion 110, the portion 120 and a portion 130 of the code-stream 100. Finally, data representing the next lowest resolution, (i.e. resolution 3), comprises the first portion 110, the portion 120, the portion 130 and a portion 140 of the code-stream 100. Each resolution (i.e., resolution 0, 1, 2 and 3), comprises a contiguous sequence of data. Further, the number of data points represented in each resolution is substantially the same as the number of pixels in an image decoded at the given resolution. Still further, the size of the compressed image is not compromised by the multi-resolution property. That is, the size of the compressed image is not substantially larger than an image compressed using a similar method that does not have the efficient multi-resolution decoding property.

Figure 2:
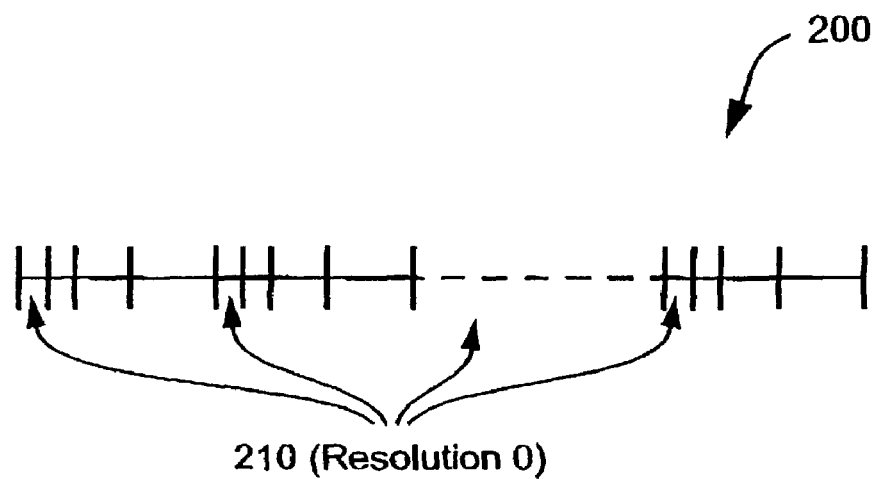
FIG. 2 shows a representation of a compressed image code-stream containing data corresponding to a single image resolution, where the data is distributed in many segments throughout the code-stream.

A JPEG2000 image code-stream can be encoded according to the format shown in FIG. 1, notably when one tile, as will be described below, is employed and the corresponding compressed image is encoded in a resolution progressive mode. However, when using tiles or quality progressive mode, or both tiles and quality progressive mode (e.g. using tile parts), in accordance with the JPEG2000 standard, the data corresponding to resolution 0, for example, can be distributed in many segments (e.g. the segments 210) throughout a code-stream 200, as shown in FIG. 2. In order to decode resolution 0, from the compressed code stream 200, each of the resolution 0 segments 210 need to be found and read. The processing time taken to search for each of the segments 210 can significantly slow the decoding process.

Figure 3:
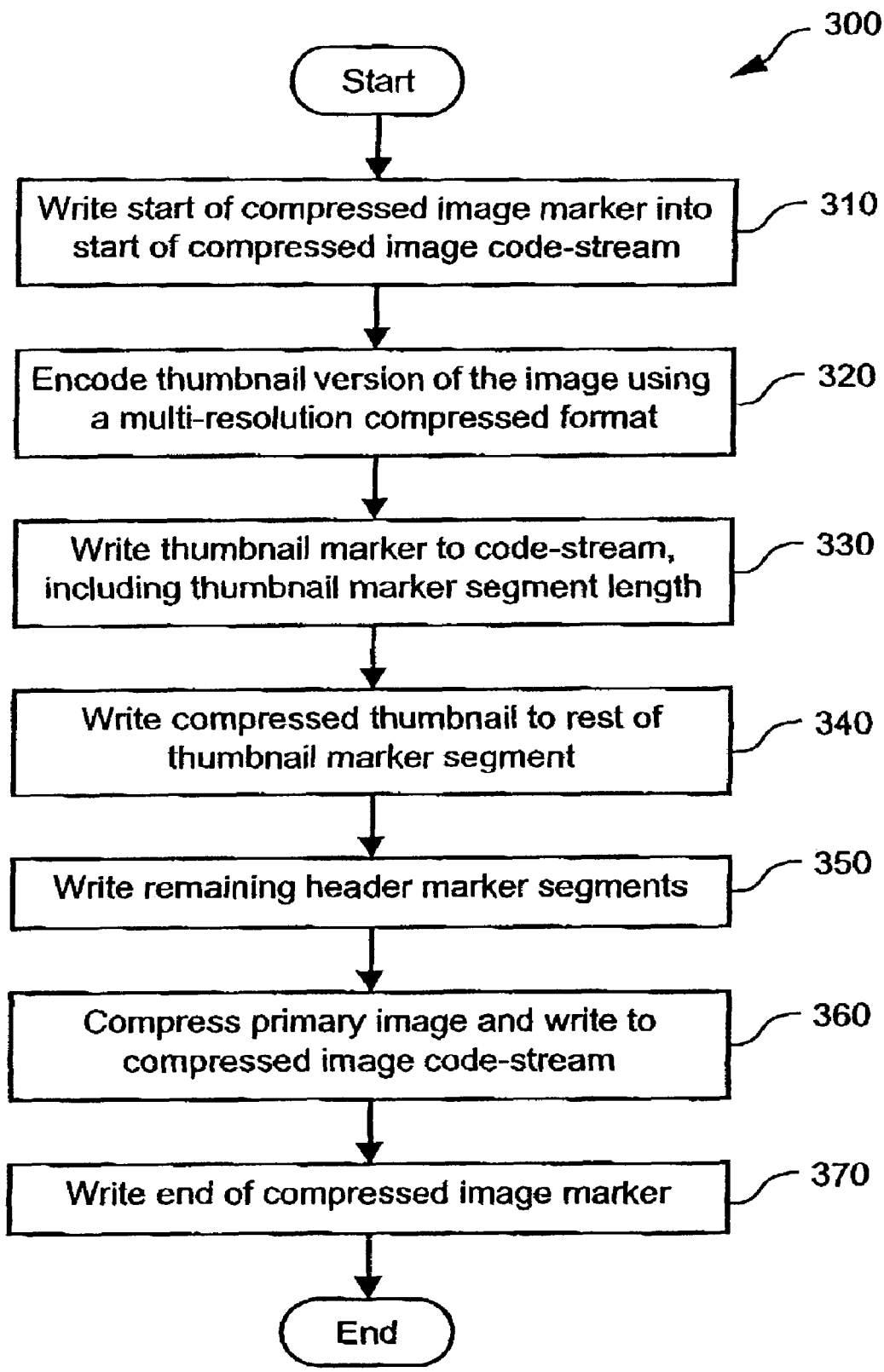
FIG. 3 is a flow diagram showing a method of encoding a thumbnail image into a primary compressed image code-stream, using a multi-resolution format.

The arrangements described herein preferably utilise a compressed thumbnail image code-stream format 100 substantially as shown in FIG. 1. FIG. 3 is a flow diagram showing a method 300 of encoding a thumbnail image into a primary compressed image code-stream, using the multi-resolution format of FIG. 1. An image to be compressed using the method 300, for example, is hereinafter referred to as the primary image. A second image, referred to as a thumbnail image, is a smaller version of the primary image. As will be explained in detail below, the result of performing the method 300 on a primary image is a primary image code-stream containing the primary image. The thumbnail image associated with the primary image is encoded into a thumbnail code-stream, which is embedded into the header of the primary image code-stream.

Figure 12:
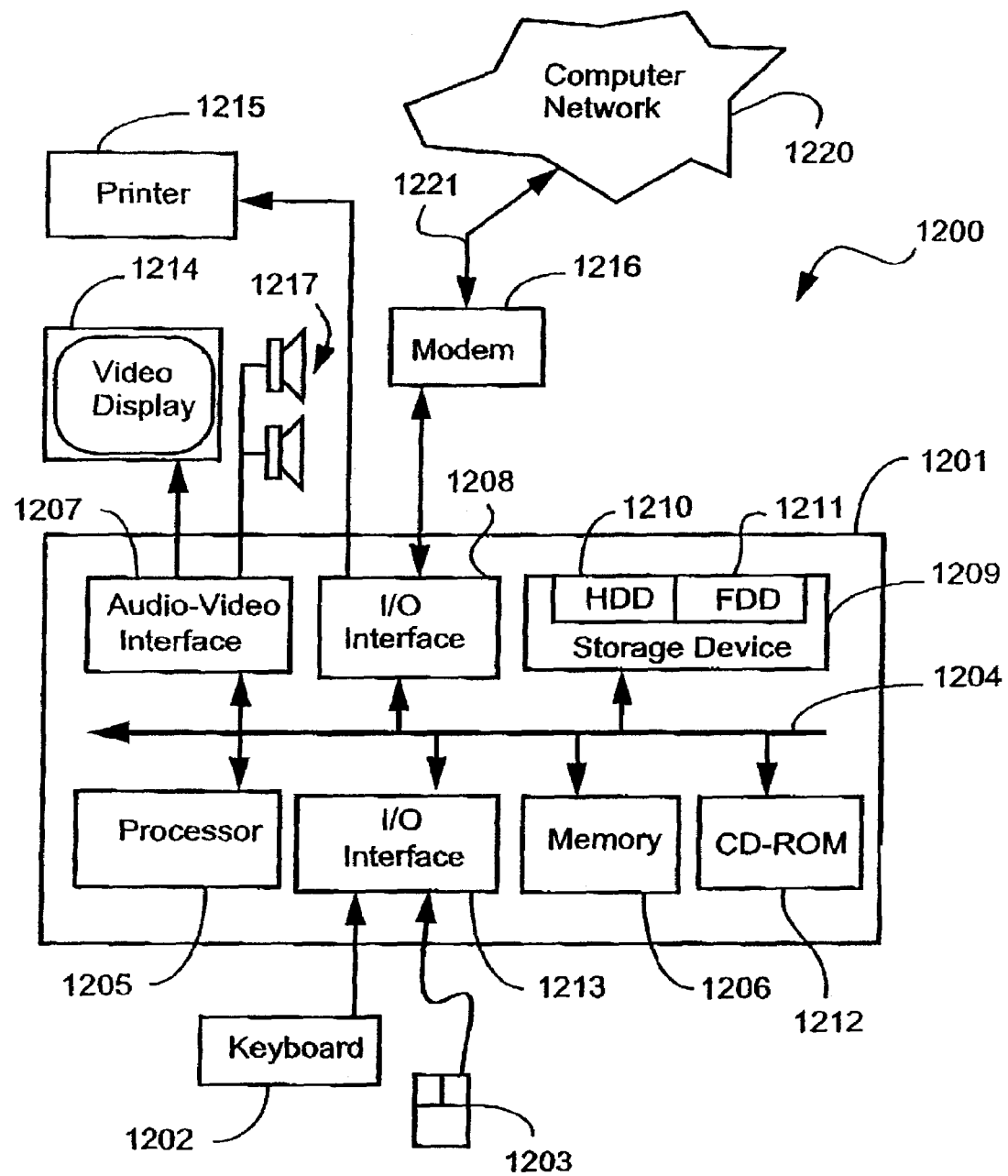
FIG. 12 is a schematic block diagram of a general purpose computer upon which arrangements described can be practiced.

The arrangements described herein are preferably practiced using a general-purpose computer system 1200, such as that shown in FIG. 12 wherein the processes of FIGS. 3 to 11 may be implemented as software, such as an application program executing within the computer system 1200. In particular, the steps of the methods are effected by instructions in the software that are carried out by the computer. The instructions may be formed as one or more code modules, each for performing one or more particular tasks. The software may also be divided into two separate parts, in which a first part performs the methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for implementing the methods described herein.

The computer system 1200 is formed by a computer module 1201, input devices such as a keyboard 1202 and mouse 1203, output devices including a printer 1215, a display device 1214 and loudspeakers 1217. A Modulator-Demodulator (Modem) transceiver device 1216 is used by the computer module 1201 for communicating to and from a communications network 1220, for example connectable via a telephone line 1221 or other functional medium. The modem 1216 cam be used to obtain access to the Internet, and other network systems, such as a Local Area Network (LAN) or a Wide Area Network (WAN), and may be incorporated into the computer module 1201 in some implementations.

The computer module 1201 typically includes at least one processor unit 1205, and a memory unit 1206, for example formed from semiconductor random access memory (RAM and read only memory (ROM). The module 1201 also includes an number of input/output (I/O) interfaces including an audio-video interface 1207 that couples to the video display 1214 and loudspeakers 1217, an I/O interface 1213 for the keyboard 1202 and mouse 1203 and optionally a joystick (not illustrated), and an interface 1208 for the modem 1216 and printer 1215. In some implementations, the modem 1216 may be incorporated within the computer module 1201, for example within the interface 1208. A storage device 1209 is provided and typically includes a hard disk drive 1210 and a floppy disk drive 1211 A magnetic tape drive (not illustrated) may also be used. A CD-ROM drive 1212 is typically provided as a non-volatile source of data. The components 1205 to 1213 of the computer module 1201, typically communicate via an interconnected bus 1204 and in a manner, which results in a conventional mode of operation of the computer system 1200 known to those in the relevant art. Examples of computers on which the described arrangements can be practiced include IBM-PC's and compatibles, Sun Sparcstations or alike computer systems evolved therefrom.

Typically, the application program is resident on the hard disk drive 1210 and read and controlled in its execution by the processor 1205. Intermediate storage of the program and any data fetched from the network 1220 may be accomplished using the semiconductor memory 1206, possibly in concert with the hard disk drive 1210. In some instances, the application program may be supplied to the user encoded on a CD-ROM or floppy disk and read via the corresponding drive 1212 or 1211, or alternatively may be read by the user from the network 1220 via the modem device 1216. Still further, the software can also be loaded into the computer system 1200 from other computer readable media. The term "computer readable medium" as used herein refers to any storage or transmission medium that participates in providing instructions and/or data to the computer system 1200 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1201. Examples of transmission media include radio or infra-red transmission channels as well as a network connection to another computer or networked device, and the Internet or Intranets including e-mail transmissions and information recorded on Websites and the like.

The method 300 of compressing a primary and thumbnail image into a primary image code-stream will now be described with reference to FIGS. 3, 4 and 5. The primary image code-stream can be stored on the hard disk drive 1210, in memory 1206 or communicated to the system 1200 from a communications network 1220 via the modem device 1216.

The method 300 is preferably implemented as software resident on the hard disk drive 1210 and being controlled in its execution by the processor 1205. The resulting primary image code-stream is preferably generated in accordance with the JPEG image compression standard. The method 300 begins at the first step 310, where the processor 1205 writes a start of image marker to a primary image code-stream stored in memory 1206. The marker is preferably the two-byte sequence '0xFFD8', where 0x is used to indicate a hexadecimal number. At the next step 320, a thumbnail version of the primary image is compressed in a multi-resolution format into a compressed thumbnail code-stream. The compression of the thumbnail version of the primary image will be described below with reference to FIGS. 4 and 5. The method 300 continues at the next step 330, where a thumbnail marker is written to the primary image code-stream stored in memory 1206. The thumbnail marker is preferably a JPEG application marker (i.e., APP1), as described in Chapter 7 of Pennebaker et al, consisting of the two byte sequence 0xFFE0, followed by a two-byte length field, followed by the 14 byte character string "multiresthumb".

The method 300 continues at the next step 340, where the processor 1205 writes the compressed thumbnail code-stream to the remainder of the APP1 marker segment of the primary image code-stream stored in memory 1206. The two-byte length field of the APP1 marker segment indicates the length of the APP1 marker segment, from the two-byte length bytes to the end of the compressed thumbnail bytes (i.e. the 2 byte APP1 marker is ignored in determining the length). At the next step 350, the remaining portion of the primary image header is written to the primary image code-stream stored in memory 1206. This remaining portion consists of the DQT (i.e. definition of quantization table to be used), DHT (i.e. definition of Huffman tables to be used in first scan), SOF (i.e. start of frame) and SOS (i.e. start of scan), JPEG marker segments. The method 300 continues at the next step 360, where the primary image is compressed and written to the primary image code-stream stored in memory 1206. The primary image code-stream is compressed in accordance with the baseline JPEG format discussed above. The method 300 concludes at the next step 370, where an end of compressed image marker is appended to the primary image code-stream. The end of the compressed image marker is preferably the JPEG EOI (i.e. End of Image) marker, 0xFFD9.

Embedding a compressed thumbnail image in an APP1 JPEG marker segment (i.e., in the header of a JPEG image) as described above, enables standard JPEG readers to decode the corresponding primary compressed image since the image is a fully compliant JPEG image.

In one arrangement, the compressed thumbnail codestream is embedded in a primary image code-stream in a manner, which is substantially conformant to the Exif format. However, in the arrangements described herein the compressed thumbnail code-stream is conformant to a spectral selection progressive mode of JPEG, as opposed to baseline JPEG. Otherwise, the format of the arrangements described herein is conformant to the Exif format. One advantage of the described arrangement is that most software readers that read Exif images can decode spectral selection progressive JPEGs, and in particular those that use source code produced by the 'Independent JPEG Group (IJG)'. Thus, most existing Exif readers need no modification in order to read the spectral selection progressive JPEG thumbnails described herein, as opposed to baseline JPEG thumbnails embedded in a primary compressed image otherwise conformant to the Exif format.

The method 300 advantageously utilizes the spectral selection progressive mode of the JPEG compression standard to allow an efficient multi-resolution decoding of a JPEG encoded thumbnail image embedded in a compressed primary image code-stream. Thus, an efficient multi-resolution decoding can be achieved.

In baseline mode JPEG compression and in inverse operation decompression, an image is typically tiled into a plurality of blocks, each block comprising eight rows of eight pixels, hereinafter referred to as an '8×8 block of pixels' or simply a 'block of pixels'. If necessary, extra columns of image pixel data can be appended to the image by replicating a column of the image, so that the resulting image width is a multiple of eight. Similarly, a row of the image can be replicated to extend the image, if necessary. Each 8×8 block of pixels is then discrete cosine transformed (DCT) into an 8×8 block of DCT coefficients. The coefficients of each block of the image are quantized and arranged in a "zigzag" scan order. The coefficients are then encoded in a loss-less manner using a zero run-length and magnitude type code with Huffman coding, or Arithmetic coding. In this manner, all the coefficients (i.e., an entire zigzag sequence) of one block of pixels are encoded, into a code-stream, before a next block. The blocks of the tiled image are processed in raster scan order as required by the baseline JPEG standard.

Figure 4:
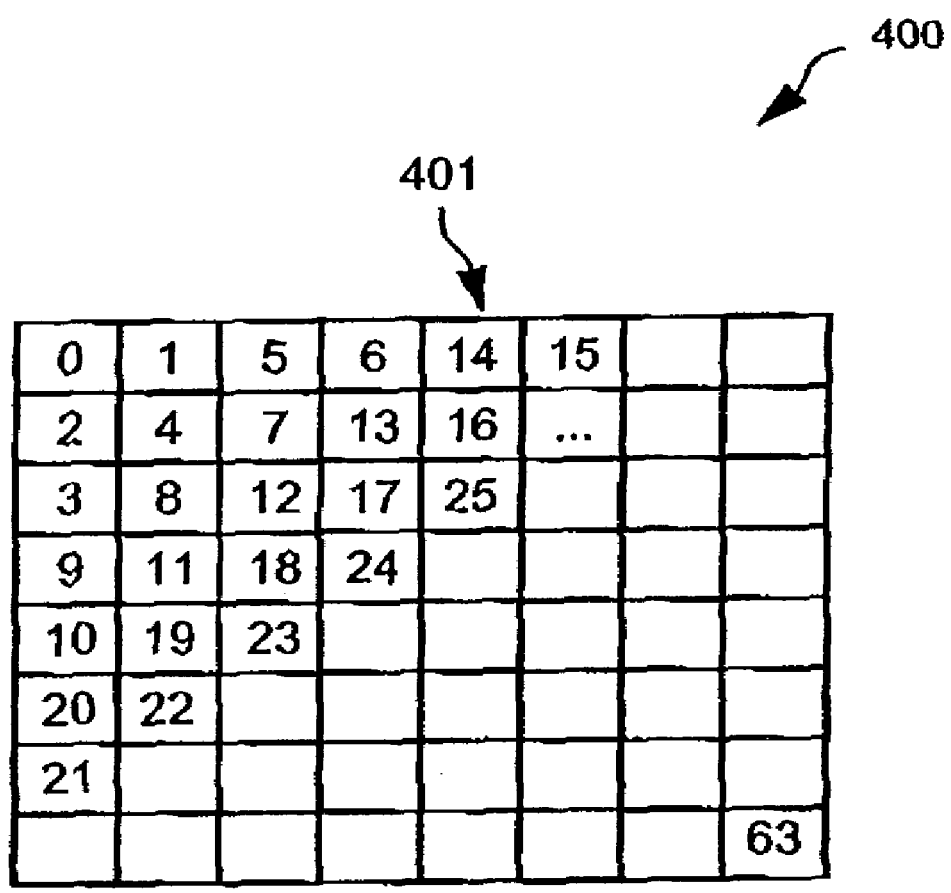
FIG. 4 is a table showing Discrete Cosine Transform (DCT) coefficients arranged in zigzag scan order.

Referring to FIG. 4, there is shown a typical 8×8 block 400 of DCT coefficients (e.g. 401) arranged in zigzag scan order, as described above. A coefficient index, taken in increasing order, starting from the number zero (0) and ending at number 63 defines the zigzag scan order.

In spectral selection mode, the zigzag sequence of coefficients, for each 8×8 block of DCT coefficients, is divided into a plurality of contiguous segments. Each segment is then encoded, in order, in separate scans through the image Coefficients in a first segment of each block are encoded into a code-stream before coefficients of a next segment of each block, and encoding continues in such a manner until substantially all segments of every block of the image are encoded.

Figure 5:
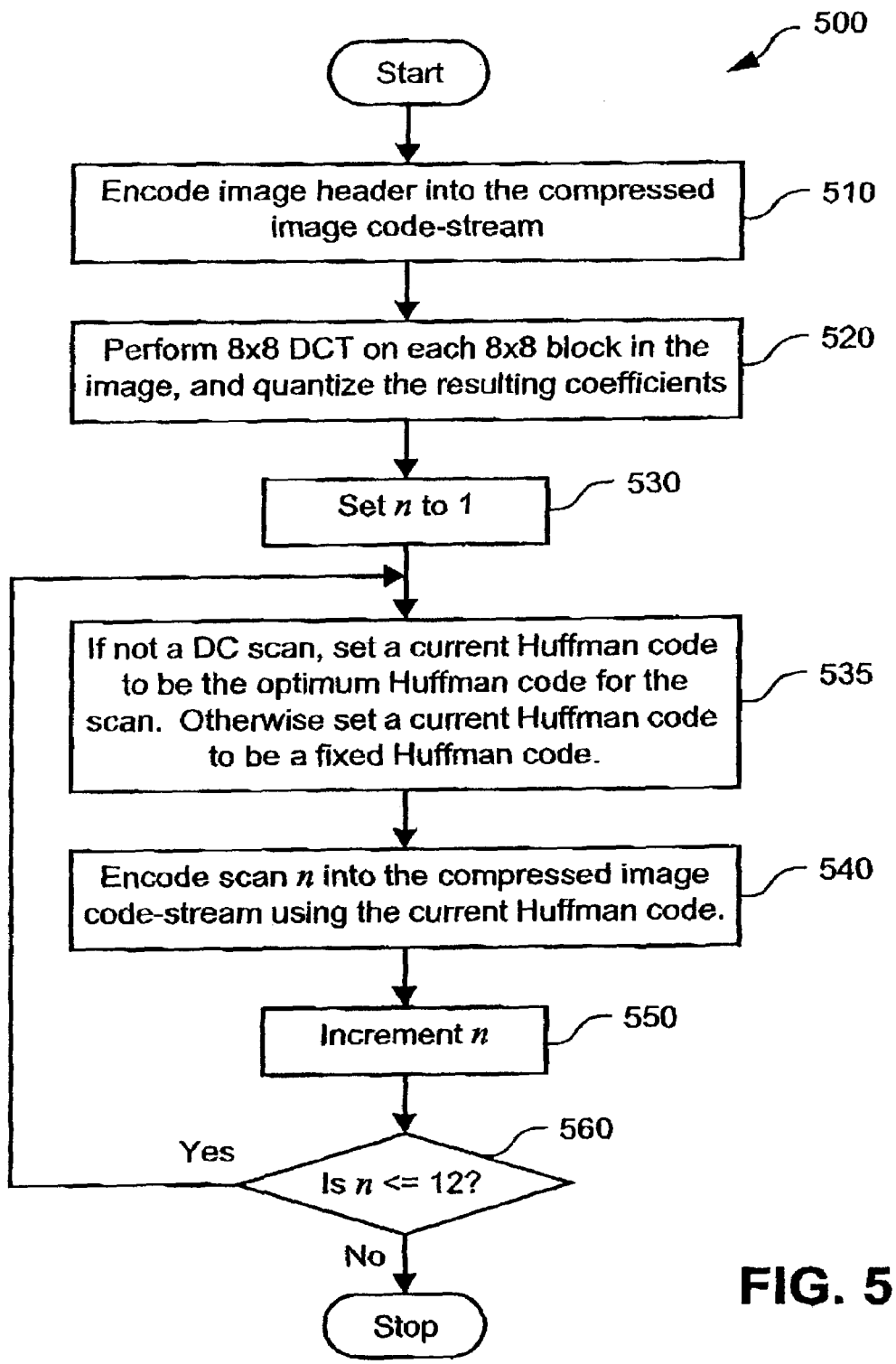
FIG. 5 shows is a flow diagram showing a method of compressing a thumbnail image, as performed during the method of FIG. 3.

FIG. 5 shows a method 500 of compressing a thumbnail image into a compressed thumbnail code-stream, as performed during step 320 of the method 300, in order to allow efficient multi-resolution decoding. The thumbnail image to be encoded is preferably of size 160×120 pixels and is encoded in the Luminance-Chrominance YCbCr colour space, resulting in three colour components. The method 500 is preferably implemented as software resident on the hard disk drive 1210 and being controlled in its execution by the processor 1205. The method 500 begins at step 510, where the processor 1205 generates an image header and encodes the image header into the compressed thumbnail code-stream stored in memory 1206, in accordance with the spectral selection mode of the JPEG standard. However, there are preferably no comment (COM) or application (APPN) JPEG markers used in encoding the image header. At the next step 520, an 8×8 DCT is performed on each 8×8 block of pixels of the image, and each coefficient is quantized, according to the JPEG standard.

The method 500 continues at the next step 530, where a scan number n is set to one (i.e., initialized) by the processor 1205. At the next step 535, if a current scan is not a DC scan (i.e. does not contain DC coefficients) then a first pass is made through the quantized DCT coefficients in order to determine an optimum Huffman code for the scan. As such the Huffman code determined at step 535 is dependent on the image (scan or resolution) being encoded. An optimum Huffman code is generated according to the frequency of occurrence of each symbol to be Huffman encoded. A current Huffman code is set to this optimum Huffman code. If the current scan is a DC scan, then a current Huffman code is preferably set to an example Huffman code for the DC coefficients as specified in the JPEG standard as appropriate for the luminance (Y) component. Alternatively, the DC coefficients for the luminance (Y) component can be used to encode the luminance component only, and the example Huffman code for the DC coefficients can be used as appropriate for the chrominance (Cb and Cr) components. In another alternative arrangement, a simple fixed Huffman code can be used. As such, the Huffman code for a DC scan is fixed and independent of the image being encoded. Such a simple fixed Huffman code will be described below. At the next step 540 of the method 500, the current scan number n is encoded into the compressed thumbnail code-stream, stored in memory 1206, using the current Huffman code.

For non-DC scans, a DHT marker segment, as discussed above, defining the Huffman code used is written to the compressed thumbnail code-stream, stored in memory 1206, prior to the start of scan (SOS) marker segment, in accordance with the JPEG interchange format for compressed image data, For DC scans, a DHT marker segment, defining the fixed DC Huffman code, is written to the compressed thumbnail code-stream only prior to the first DC scan, In one arrangement, no DHT marker segment is written to the compressed thumbnail code-stream prior to the DC scans. In this instance, the resulting JPEG image is not compliant with the JPEG interchange format, and a decoder must have knowledge of the appropriate Huffman table via other mechanisms.

Following the SOS marker segment, the encoded data for the scan is written to the thumbnail code-stream, stored in memory 1206. The scan number n represents a current scan through an image as described above with reference to the spectral selection mode of JPEG. As noted above, each 8×8 block of DCT coefficients is arranged in a zigzag order, as shown in FIG. 4. The zigzag sequence of quantized coefficients for each block is separated into contiguous segments and each segment is encoded in one scan through the image (for each component). That is, all the coefficients in the first segment are coded for each block in a component in a first scan for the given component. Then all of the coefficients in the next segment are encoded for each block in the component in the second scan for the given component, and so on until substantially all segments of all blocks in the component are encoded.

In method 500, each 8×8 block of DCT coefficients is preferably divided into four contiguous segments and when coding three components of an image separately there are thus twelve scans of the image. The contiguous segments are as shown in Table 1, below, for each component, with the corresponding scan number. The contiguous segments are indicated by a start coefficient and an end coefficient index corresponding to the coefficient index of the zigzag scan order of FIG. 4.

TABLE 1

| Scan number | Component | Start coefficient | End coefficient |
|---|---|---|---|
| 1 | Y | 0 | 0 |
| 2 | Cb | 0 | 0 |
| 3 | Cr | 0 | 0 |
| 4 | Y | 1 | 4 |
| 5 | Cb | 1 | 4 |
| 6 | Cr | 1 | 4 |
| 7 | Y | 5 | 18 |
| 8 | Cb | 5 | 18 |
| 9 | Cr | 5 | 18 |
| 10 | Y | 19 | 63 |
| 11 | Cb | 19 | 63 |
| 12 | Cr | 19 | 63 |

With reference to Table 1, the seventh scan, for example, includes the coefficients of FIG. 4 indicated by index 5 to index 18 for the Y component of the thumbnail image. That is, the seventh scan comprises fourteen coefficients of each 8×8 block of DCT coefficients of the Y component. Accordingly, the first scan comprises one coefficient for each block, being the zero or DC coefficient of FIG. 4 for the Y component. The second scan comprises one coefficient for each block, being the zero or DC coefficient of FIG. 4 for the Cb component, and so on.

In a first scan, when the scan number n is 1, coefficient 0 (i.e., the DC coefficient), is encoded for each block of the Y component. A current segment of each and of substantially all of the blocks of the Y component of the image, is encoded into the code-stream stored in memory 1206 before a next segment is encoded.

The method 500 continues at the next step 550, where scan number n is incremented by one. At the next step 560, if the scan number n is less than or equal to 12 (i.e., the maximum number of scans for the method 500) then processing recommences at step 535 and steps 535 to 560 are repeated with a current scan number. If all of the scans have been encoded into the compressed thumbnail code-stream at step 560, then the method 500 concludes.

Accordingly, when the scan number n is equal to 4, 5 or 6, a second segment of each block of DCT coefficients (i.e., coefficient index 1 to 4 inclusive as seen in FIG. 4) of each component of the image is encoded into the compressed thumbnail code-stream, stored in memory 1206. When the scan number n is equal to 7, 8 or 9, coefficient index 5 to 18 of FIG. 4 inclusive, are encoded for each block in the image and placed after all encoded second segments in the thumbnail code-stream. Finally, when n is equal to 10, 11 or 12, the remaining coefficients (i.e. index 19 to 63 inclusive of FIG. 4) are encoded for each block in each component of the image. The reason for such a selection of scans is discussed below.

Instead of the JPEG standard specified DC Huffman codes, utilized in step 535 of the method 500, an alternative fixed Huffman code can be used. In this instance, such a fixed Huffman code is specified by the following BITS and HUFFVAL lists, as used in the JPEG standard to represent the number of codes of each length, and the symbol values to be associated with these codes respectively:

BITS={1, 0, 0, 0, 15, 0, 0, 0, 0, 0, 0, 0, 0, 0, 0, 0}; and
HUFFVAL={0, 1, 2, 3, 4, 5, 6, 7, 8, 9, 10, 11, 12, 13, 14, 15}.

The Huffman code shown directly above is referred to as a first simple DC Huffman code. In a further arrangement, the following lists can be used with a DC quantization step size of at least eight:

BITS={0, 1, 0, 11, 0, 0, 0, 0, 0, 0, 0, 0, 0, 0, 0, 0}; and
HUFFVAL={0, 1, 2, 3, 4, 5, 6, 7, 8, 9, 10, 11}.

In one alternative arrangement, existing Exif image files containing a primary JPEG compressed image code-stream that contains a baseline compressed JPEG thumbnail image in an APP1 marker segment, can be transcoded to the multi-resolution JPEG format described above with reference to FIGS. 3 and 5. In such a case, the Exif thumbnail can be entropy decoded as far as the DCT coefficients, to form an array of DCT coefficients, with one array per thumbnail component. The resulting DCT arrays can then be entropy coded into the scan progressive format described in FIG. 5. The resulting progressive JPEG file can then be used to replace the baseline JPEG thumbnail in the Exif primary compressed image code-stream. In such a manner, existing Exif thumbnail images can be transcoded to a multi-resolution format without loss. Typically, the size of the multi-resolution thumbnail image is smaller than the size of the equivalent compressed JPEG thumbnail image, since optimum Huffman tables are used for all but the DC scans. In this instance, only the thumbnail portion of the Exif file needs to be rewritten, with the extra space that was taken by the baseline JPEG file ignored. As a result, the transcoding operation is particularly fast, requiring a minimal change to the Exif file.

Figure 6:
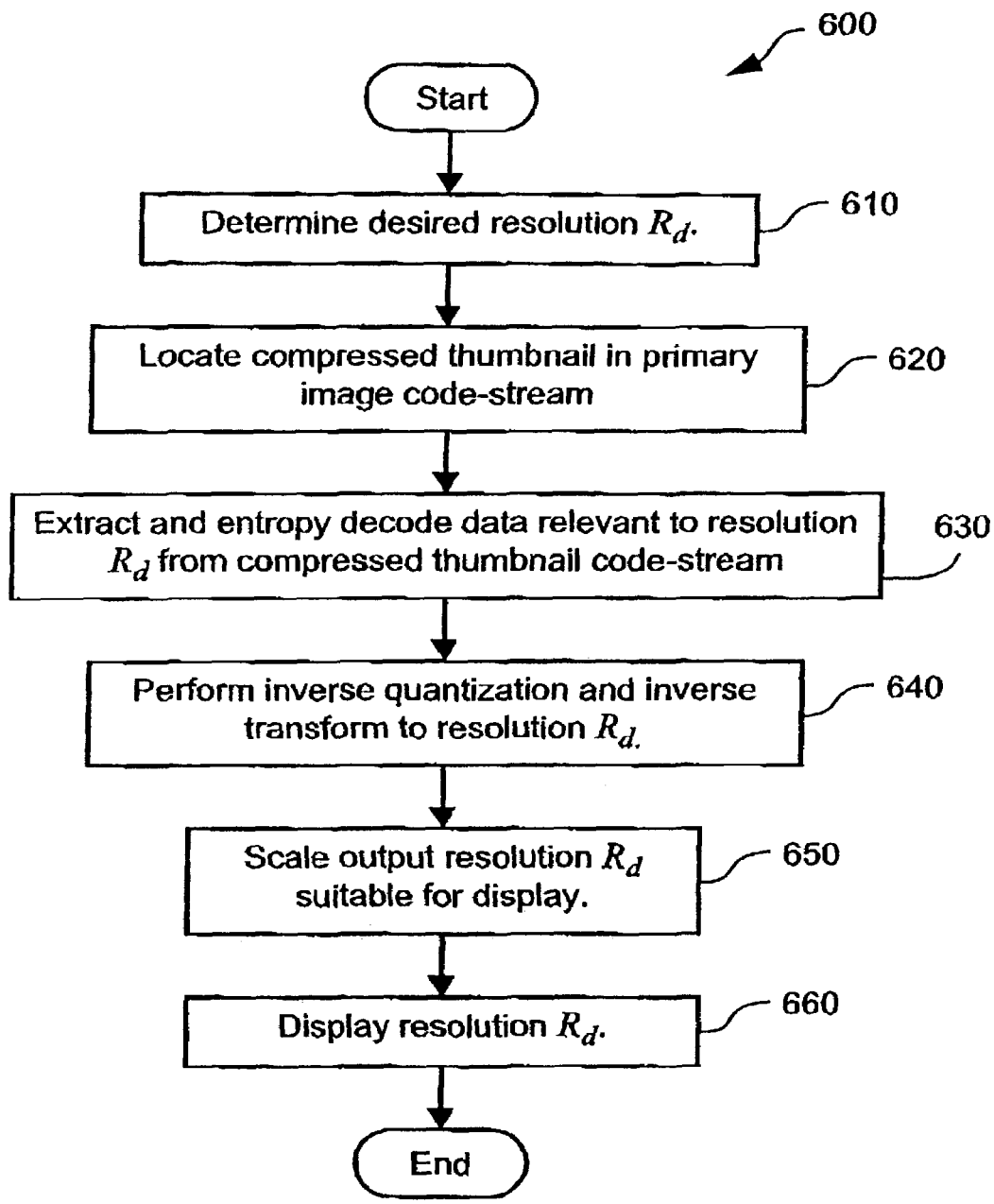
FIG. 6 is a flow diagram showing a method of decoding a multi-resolution thumbnail image embedded in a primary compressed image code-stream.

FIG. 6 shows a method 600 of decoding a multi-resolution thumbnail image. The thumbnail image to be decoded is embedded within a primary compressed image code-stream, stored in memory 1206, according to the methods 300 and 500 described above. The method 600 is preferably implemented as software resident on the hard disk drive 1210 and being controlled in its execution by the processor 1205. The method 600 provides efficient multi-resolution decoding of a thumbnail compressed image embedded in a primary image code-stream. The method 600 begins at step 610, where a desired decoding resolution, $R_d$, is determined by the processor 1205. The different possible decode resolutions are labeled 0, 1, 2, ..., R, where preferably resolution 0 is $2^R$ times smaller in each dimension compared to the size of the original compressed thumbnail image, resolution 1 is $2^{R-1}$ times smaller and so on. Thus, resolution r is $2^{R-r}$ times smaller than resolution R, resolution R being the size of the full size thumbnail, and resolution R represents the full size decoded thumbnail itself. The desired resolution $R_d$ can be provided as input to the method 600 by a software application such as an image browsing application being executed by the processor 1205.

At the next step 620, the compressed thumbnail image code-stream is located in the primary image code-stream stored in memory 1206. The method 600 continues at the next step 630, where the data relevant to resolution $R_d$ is extracted and entropy decoded from the compressed thumbnail image code-stream. At the next step 640, the entropy decoded data is dequantized and inverse transformed to the desired resolution $R_d$. The inverse transform preferably includes a YCbCr to RGB (i.e., Red, Green, Blue) inverse colour transform. Then at step 650, the inverse transformed data is scaled suitable for display on the display 1214, for example. The method 600 concludes at the next step 660 where the data is displayed on the display 1214, Steps 630 to 650 of the method 600 will be explained in further detail below with reference to FIG. 7.

In a one arrangement of the method 600, following step 620, a check can be made by the processor 1205 to determine if the compressed thumbnail is in a multi-resolution format. If the thumbnail is in a multi-resolution format then decoding continues as described from step 630 onwards. If the thumbnail is not in a multi-resolution format, then the thumbnail can be decoded at resolution $R_d$ by decoding substantially all of the entropy coded data required to be decoded at resolution $R_d$. Data which is not relevant to resolution $R_d$ can be discarded. The formation of resolution $R_d$ can then be performed whilst the processor 1205 is executing the inverse transform.

The method 600 can be utilized to decode many thumbnail images. Further, the decoding of a set of thumbnails is described in detail below with particular reference to FIG. 11. Each thumbnail in a set is preferably decoded at a desired resolution and the set of decoded thumbnails displayed on the display 1214, for example. The display time for a set of thumbnails is substantially determined by the decode (and display) time for one thumbnail multiplied by the number of thumbnails in the set. The faster the decoding of each thumbnail in the set, the faster the decoding of the set.

Using a standard conventional multi-resolution format, when the decoded thumbnail resolution is small, many more thumbnails can be decoded in a given amount of time as compared to when the resolution is large. However, the efficient multi-resolution format described herein, allows a greater number of thumbnails to be displayed quickly, substantially independent of the resolution of the decoded thumbnails.

Figure 7:
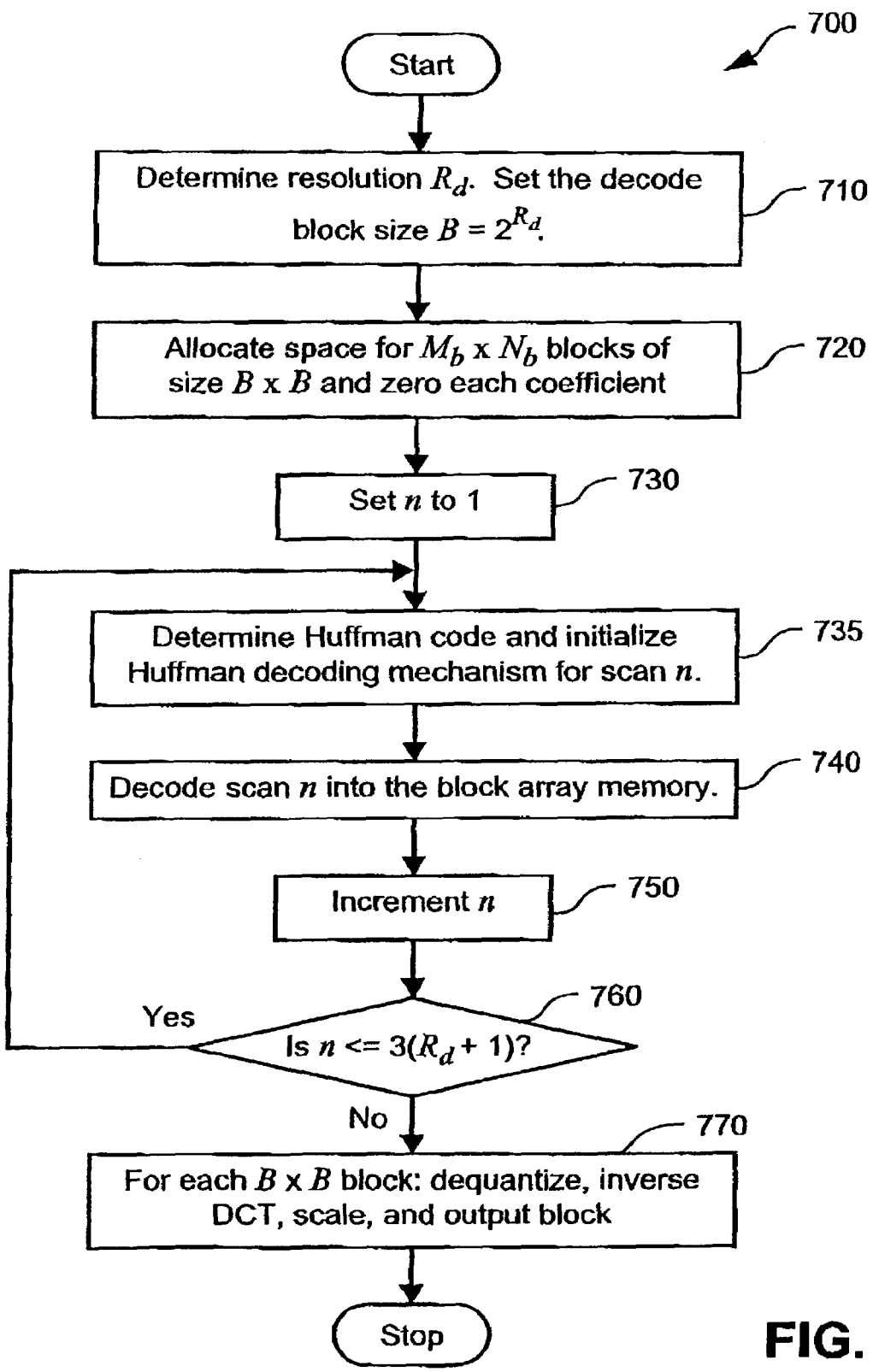
FIG. 7 is a flow diagram showing a method of decompressing a multi-resolution thumbnail image, as performed during the method of FIG. 6.

FIG. 7 is a flow diagram showing a method 700 of decompressing a multi-resolution thumbnail image, as performed during steps 630 to 650 of the method 600. The thumbnail image to be decoded is embedded within a primary compressed image code-stream, stored in memory 1206, according to the methods 300 and 500. The possible image resolutions resulting from performing the method 700 on an encoded thumbnail image are 0, 1, 2 or 3 corresponding to a decoded image that is respectively $2^3$, $2^2$, $2^1$ and $2^0$ times smaller, in each dimension, than a full size encoded image. For example, a decoding resolution $R_d=0$ corresponds to a decoded image with eight times fewer rows and eight times fewer columns as the original full size encoded image. The compressed thumbnail is preferably encoded in the YCbCr colour space, and there are thus preferably three image components.

The method 700 is preferably implemented as software resident on the hard disk drive 1210 and being controlled in its execution by the processor 1205. The method 700 begins at step 710, where a block size is set to $B=2^{R_d}$. That is, the method 700 is performed on blocks of DCT coefficients where the size, in number of coefficients, of a block is B×B and $B=2^{R_j}$ for the resolution $R_d$ determined at step 610 of the method 600. In this connection, for the methods described above an image comprises $M_b \times N_b$ blocks at encoding. $M_b \times N_b$ being the number of blocks that an image is decomposed into at step 520 of the method 500. The method 700 continues at the next step 720, where a portion of memory 1206 corresponding to $M_b \times N_b$ blocks, of size B×B, is allocated by the processor 1205 (i.e., the desired size of the decoded image is $BM_b \times BN_b$ pixels).

At the next step 730 of the method 700, a scan number n is set to one. Then at step 735, the Huffman code specification for scan n is determined from the compressed thumbnail code-stream stored in memory 1206, and any other Huffman decoding mechanisms are initialized by the processor 1205. Preferably, for non-DC scans, initializing the Huffman decoding mechanism involves determining Huffman codewords from the known JPEG Huffman code specification, and initializing two lookup tables (LUT) of preferably 256 entries each. A first LUT of the two LUTs is for decoding symbols less than or equal to eight bits in length, and the second LUT is for determining the number of bits in a codeword, or zero for those symbols longer than eight bits. A next symbol is decoded by using a next eight bits of the code-stream (of Huffman codewords) to index each LUT. If the number of codeword bits is zero, as given by the second LUT, then the codeword is longer than eight bits, and conventional Huffman decoding, as specified in the JPEG standard is preferably used to determine the next symbol. Otherwise the next symbol is given by the first LUT value. The given number of codeword bits is then removed from the code-stream in preparation for decoding further symbols.

In the arrangements described herein, a fixed Huffman code is used for a DC scan. The Huffman decoding mechanisms are initialized once for the fixed Huffman code, and then used for multiple images. Fixed Huffman code look up tables are initialized once and used for multiple images. For other scans, the Huffman code is scan or resolution dependent, and hence the code and decoding mechanisms need to be determined for such scans prior to decoding of the scan.

At the next step 740 of the method 700, scan n is decoded into the portion of memory 1206 allocated at step 720, using the determined Huffman code and Huffman decoding mechanims. For example, in the method 700 the first scan (n=1) consists only of coefficient 0, the DC coefficient, for each block. Thus, the DC coefficient is decoded into each block (i.e., B×B) of the $M_b \times N_b$ blocks allocated space. However, as will be described below, not all decoded coefficients are always used and written into the memory 1206 allocated at step 720.

The method 700 continues at the next step 750, where the scan number n is incremented by the processor 1205. Then at decision block 760, the processor 1205 determines if the current scan number n is less than or equal to $3(R_d+1)$, where the factor "3" refers to the number of components. If decision step 760 is true, then the method 700 returns to step 735 with the current scan number. If decision block 760 returns false, then the method 700 continues at step 770. In this manner, $3(R_d+1)$ scans are decoded. For example, for r=0, 1, 2, and 3, the number of scans decoded is respectively 3, 6, 9 and 12.

Figure 8:
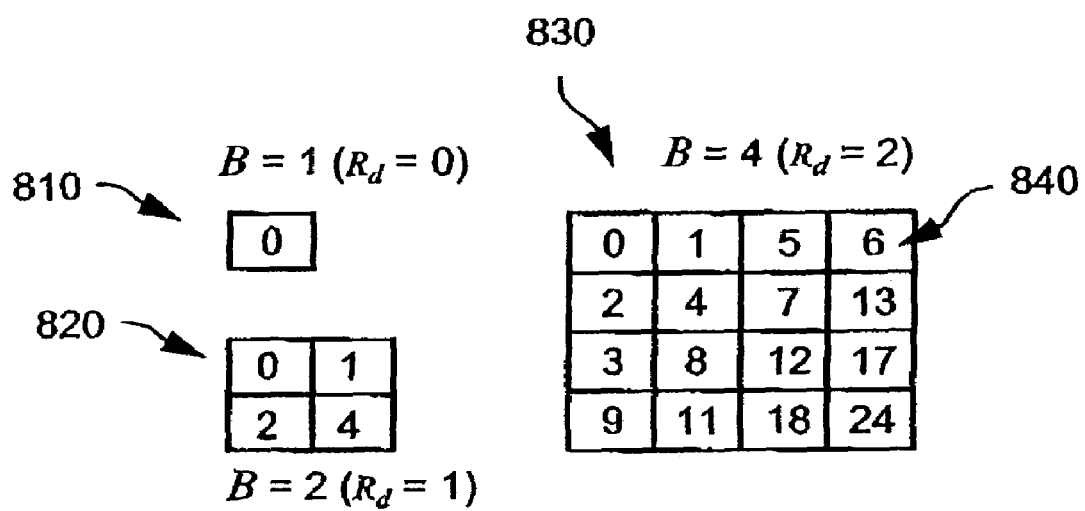
FIG. 8 shows three blocks of pixels of various sizes in accordance with a desired decoding resolution.

Referring now to FIG. 8, there are shown three blocks of pixels 810, 820 and 830 of various sizes in accordance with a desired decoding resolution $R_d$. Together the blocks contain sixteen coefficients numbered 0, 1, 2, 3, 4, 5, 6, 7, 8, 9, 11, 12, 13, 17, 18 and 24. As previously described, not all of the coefficients decoded during a scan are necessarily written to an allocated block of memory 1206. For a block size of one (e.g. block 810), corresponding to a decoding resolution of $R_d=0$, only the DC coefficient is used.

For a block of size of B=1, corresponding to a decoding resolution of $R_d=0$, only three scans are decoded. That is, the DC scan for each of the three components.

For a block 820 of size of B=2 there are six scans decoded. Coefficients of the first and second segments are used to construct each block (e.g. 820) and include coefficients 0, 1, 2 and 4 but exclude coefficient 3 (i.e., coefficient 3 is not used). Coefficient 0 is decoded in the first three scans, while coefficients 1 to 4 are decoded in the next three scans through the image. During the second set of three scan decoding, coefficient 3 is discarded while coefficients 1, 2 and 4 are written to their corresponding location as indicated by block 820.

Similarly for a block 830 of size B=4, coefficients for constructing the block 830 consist of coefficients 0 to 9, 11, 12, 13, 17, 18 and 24. By decoding a third set of three scans through the image, coefficients 5 to 18 for each block are decoded and coefficients 10, 14, 15 and 16 are discarded while the other coefficients (i.e., coefficients 0, 1, 2, 3 and 4) are written to their corresponding location as indicated in block 830. Coefficient 24 for each block is set to 0 since coefficient 24 belongs to a next scan.

For a block (not shown) of size B=8, all twelve scans and all coefficients are decoded. The number of scans decoded is $3(R_d+1)$, where the factor 3 corresponds to the number of components.

Returning to FIG. 7, the method 700 continues at step 770 after the last desired scan, determined by the resolution $R_d$, has been decoded by the processor 1205. For each decoded block, consisting of B×B coefficients, several operations are performed by the processor 1205. At step 770, a block is dequantized according to the usual JPEG dequantization step as known in the relevant art, and an inverse B×B discrete cosine transform is performed on each block. Also at step 770, each block is scaled or normalized, by dividing each inverse transformed coefficient by $2^{3-R_d}$. For example, where B=1, the block data is divided or scaled down by a factor of eight, reflecting the fact that a DC coefficient (i.e., coefficient 0) is the mean of the corresponding 8×8 block in the original image, multiplied or scaled up by eight. Each block can then be output to form the decoded image at the reduced resolution $R_d$ where the concatenated final output blocks constitute the decoded image components. The inverse transformed image components can be inverse transformed to RGB colour space, for example, and then the resultant image displayed on the display 1214 or buffered in memory 1206 for subsequent display, By using a fixed Huffman code for the DC scans as described above, the initialization of the Huffman decoding mechanisms is not performed when decoding an image at resolution $R_d$=0 except possibly for the first image decoded. The inventor has ascertained that the decode time is reduced by up to 25% by not performing a Huffman 8-bit LUT decoding initialization for thumbnail images of size 160× 120 pixels. For example, if a 160×120 pixel thumbnail decodes at resolution $R_d$=0 in 100 micro-seconds then 25 micro-seconds of processing time can be saved by not performing a Huffman table LUT initialization on a per image basis. Further, efficient compression can be is achieved by using image or scan dependent Huffman codes for scans other than the DC scan.

In addition, by using a single fixed Huffman code for each DC scan as described above, even when a DHT marker segment defining the Huffman code is included in the thumbnail code-stream the compression achieved for thumbnail images of the size 160×120 pixels is on average substantially the same as if compression optimum tables (as known to those in the relevant art) were used for each scan. The overhead of defining an optimum table for the DC scans appears to negate any extra compression achieved for the DC scans for an image of this size image. For the decoding of other resolutions, an increase in processing speed can be obtained by again using fixed Huffman tables. However, the increase in processing speed is far less significant (approximately 5% for $R_d$=1 and 1.25% for $R_d$=2, etc), and less compression results.

The dequantization, inverse DCT, and scaling operations are performed together at step 770 in order to increase the decoding speed for a particular thumbnail.

FIG. 13 shows a method 1300 of decoding a DC coefficient from a code-stream. The method 1300 is performed for a decoding resolution $R_d$=0 and includes scaling. The method 1300 is preferably implemented as software being resident on the hard disk drive 1210 and being controlled in its execution by the processor 1205. In this connection, Appendix A shows a software-code listing for one implementation of the method 1300. The HUFF_DECODE function (or macro), as seen in Appendix A, decodes a next Huffman coded symbol from an input code-stream. The GET_BITS(n) function (or macro) returns the next n bits from the code-stream. A next segment of the code-stream is then held in a register (i.e., a bit_register) configured within memory 1206. The HUFF_DECODE unction and the GET_ BITS(n) function update the state of the code-stream, filling the bit_register, as needed when there are insufficient bits remaining therein for extracting a next number of bits.

The method 1300 begins at step 1310, where the processor 1205 determines a DC difference magnitude category, s, for an input code-stream. At the next step 1320, if s !=0, then the method 1300 proceeds to step 1330 where the next s bits arc extracted from the input code-stream and these bits are used to determine the exact DC difference encoded within the DC difference magnitude category, s. Otherwise, the method 1300 proceeds to step 1340, where the processor 1205 adds a previous DC value, stored in memory 1206, to the decoded difference determined in steps 1310 to 1330, in order to determine the encoded DC value. At the next step 1330, the previous DC value stored in memory 1206 is updated to the new value for decoding of the next DC coefficient. The method 1300 concludes at the next step 1360, where the DC coefficient is then dequantized and scaled as follows;

$$dc\_value=(s*q\_value)/8,$$

where the variable 'q_value' represents the quantitization step size, and the variable 'dc_value' represents the dequantized and scaled DC coefficient. The operation (s * q_value) dequantizes the coefficient, whilst dividing the result of the operation (s * q_value) by '8' scales the coefficient. The division by 8 is substantially equivalent to shifting the result value right by three bits (i.e., '>>3' seen in the implementation of Appendix A), as required for $R_d$=0 decoding, If a quantization step size for the DC coefficients is eight and/or if the simple DC Huffman code, as described above, is being used, then a faster DC coefficient decoding method 1400 as shown in FIG. 14 can be executed by the processor 1205.

The method 1400 is preferably implemented as software being resident on the hard disk drive 1210 and being controlled in its execution by the processor 1205. In this connection, Appendix B shows a software-code listing for one implementation of the method 1400. The GET_BITS function is typically faster than the HUFF_DECODE function. While both the GET_BITS function and the HUFF_ DECODE function need to update the code-stream state (i.e. check there are enough bits in a bit_register configured within memory 1206, and if not then fill the bit_register), GET_BITS in addition simply needs to return a next number of bits from the code-stream. HUFF_DECODE on the other hand typically uses two lookup tables. The first lookup table is utilized by the processor 1205 to decode the symbol represented by some number of bits of the input code-stream (i.e, typically eight), while the second lookup table determines the number of bits used for the symbol from the decoded difference magnitude category, s.

The method 1400 begins at step 1410 where the processor 1205 detects the next bit from the input code-stream. At the next step 1420, if the bit is the JPEG DC difference magnitude category 0 (i.e, bit==0) then the method 1400 proceeds directly to step 1470. Otherwise, the method 1400 proceeds to step 1430. Step 1410 is performed in the implementation of Appendix B by the first line of psuedo-code (i.e., if (GET_BITS(1)) ==0)) and assumes that the 's=0' symbol is coded within the code-stream as the single bit "0", as is the case with the first simple DC Huffman code. At step 1470, the decoded and scaled DC coefficient (i.e., dc_value) is simply set to the previous DC value decoded (i.e., last_dc_val). The method 1400 and corresponding software-code implementation of Appendix B is significantly faster than the method 1300 and corresponding software-code implementation of Appendix B for the DC difference magnitude category s=0. In the case s=0, the previous DC value stored in memory 1205 (i.e., last_dc_val), need not be updated. Further, when the quantization step size is eight (i.e., q_value=8), the operation 'dc_value=(s * q_value)>>3' of Appendix A simplifies to 'dc_value=s'. Finally, the software-code implementation of Appendix B is faster than the software-code implementation of Appendix A even in the case where s>0. However, the more significant increase in processing speed results from the case where s=0.

At step 1430, the processor 1205 determines the DC difference magnitude category, s, by setting s according to the next four bits from the code-stream. At the next step 1440, the next s bits are extracted from the input code-stream and these bits are used by the processor 1205 to determine the exact DC difference encoded within the DC difference magnitude category, s. The method 1400 continues at the next step 1450, where the processor 1205 adds the previous DC value, stored in memory 1206, to the decoded difference determined at step 1440, in order to determine the encoded DC value. At the next step 1460, the previous DC value stored in memory 1206 is updated to the new value for decoding of the next DC coefficient and the method 1400 proceeds to step 1470 as described above.

The inventor has ascertained that the decode time saved by using the decoding method 1400 leads to a further 10% increase in decoding speed, over and above the savings for not initializing Huffman decoding mechanisms on a per image basis. For example, in conjunction with using a fixed DC Huffman code, a saving of up to 35% in decode time can be obtained using the arrangements described above for thumbnail images. Using a simple DC Huffman code, and a quantization step size of eight, allows for faster decoding of the DC coefficients, which particularly enhances the speed of decoding of an image at resolution $R_d=0$.

Those skilled in the relevant art will appreciate that reduced size images can be obtained by performing reduced size inverse DCT on block DCT data. In particular, the coefficients indicated in the reduced size blocks 810, 820 and 830 of FIG. 8, can be used to form reduced size images where the reduction is eight, four or two times in each dimension, respectively, corresponding to a sub-block size of one, two and four.

Again referring to FIG. 8, each block 810, 820 and 830 is a sub-block of a top left corner of an 8×8 DCT coefficient block (not shown). For example, block 830 corresponds to a sub-block of 4×4 coefficients at the top left of such a DCT coefficient block The spectral selection scan used in the method 500 is selected so that a first 3n scans substantially contain the coefficients required for the sub-block size $2^{n-1}$, n being the segment number n=1, . . . , 4, and the factor 3 corresponding to the number of components. Coding these scans, in a predetermined order and arranging each segment of a scan contiguously in a code-stream, in accordance with the arrangements described above, allows efficient multi-resolution decoding.

In the arrangements described herein, the number of coefficients decoded, dequantized and inverse transformed is substantially dependent only on a number pixels in the decoded image. Further, little redundant information is decoded from an input code-stream since only the first part of a code-stream needs to be decoded and most of the information in the first part is relevant to the decoded image. Few coefficients, if any, are discarded. Accordingly, time is substantially dependent on the number of pixels in the decoded image, and substantially independent of the number of pixels in the entire encoded image (i.e. code-stream). There are several factors, including different effective bit precision at different resolutions, which mean that such a relationship between number of pixels decode time is approximate and not exact. Nonetheless the decoding times scale roughly at a rate proportional to the size of the decoded image. For each smaller decoding size this offers a significant increase in decoding speed over conventional decoding methods.

In one arrangement, segments of an 8×8 DCT coefficient block can be arranged according to Table 2, below, where the start coefficient and end coefficient index define a segments as previously described above.

TABLE 2

| Start coefficient | End coefficient |
| --- | --- |
| 0 | 0 |
| 1 | 2 |
| 3 | 24 |
| 25 | 63 |

Another example of segment division in an 8×8 DCT coefficient block is shown in Table 3, below, where the start coefficient and end coefficient index defines a segment as described above.

TABLE 3

| Start coefficient | End coefficient |
| --- | --- |
| 0 | 0 |
| 1 | 4 |
| 5 | 24 |
| 25 | 63 |

Images compressed in other colour spaces, and with different numbers of components can be decoded in accordance with the arrangements described above. In this instance, the number of scans decoded for resolution $R_d$ is $N_c(R_d+1)$, where $N_c$ is the number of image components, where the image is encoded in scans determined by the segments given in Tables 1, 2 or 3 above, and where each component is scanned separately.

The arrangements described above segment coded data into resolutions. A first scan for each component encodes the DC coefficient, used to decode at resolution 0. A second scan for each component encodes low-frequency AC coefficients, used in combination with the DC coefficients to decode at resolution 1, and so on, Thus, the coded data is said to be encoded in separate resolutions. The lowest resolution (i.e., the DC resolution of resolution 0) is encoded with a Huffman code that is fixed across a set of images, while the other resolutions are encoded with a Huffman code that is image, or resolution dependent. The Huffman code used is dependent on the image (and resolution) for which the code is used. In particular, the optimum Huffman code, for each resolution, is preferably used for all but the lowest resolution in order to obtain good compression.

Figure 9:
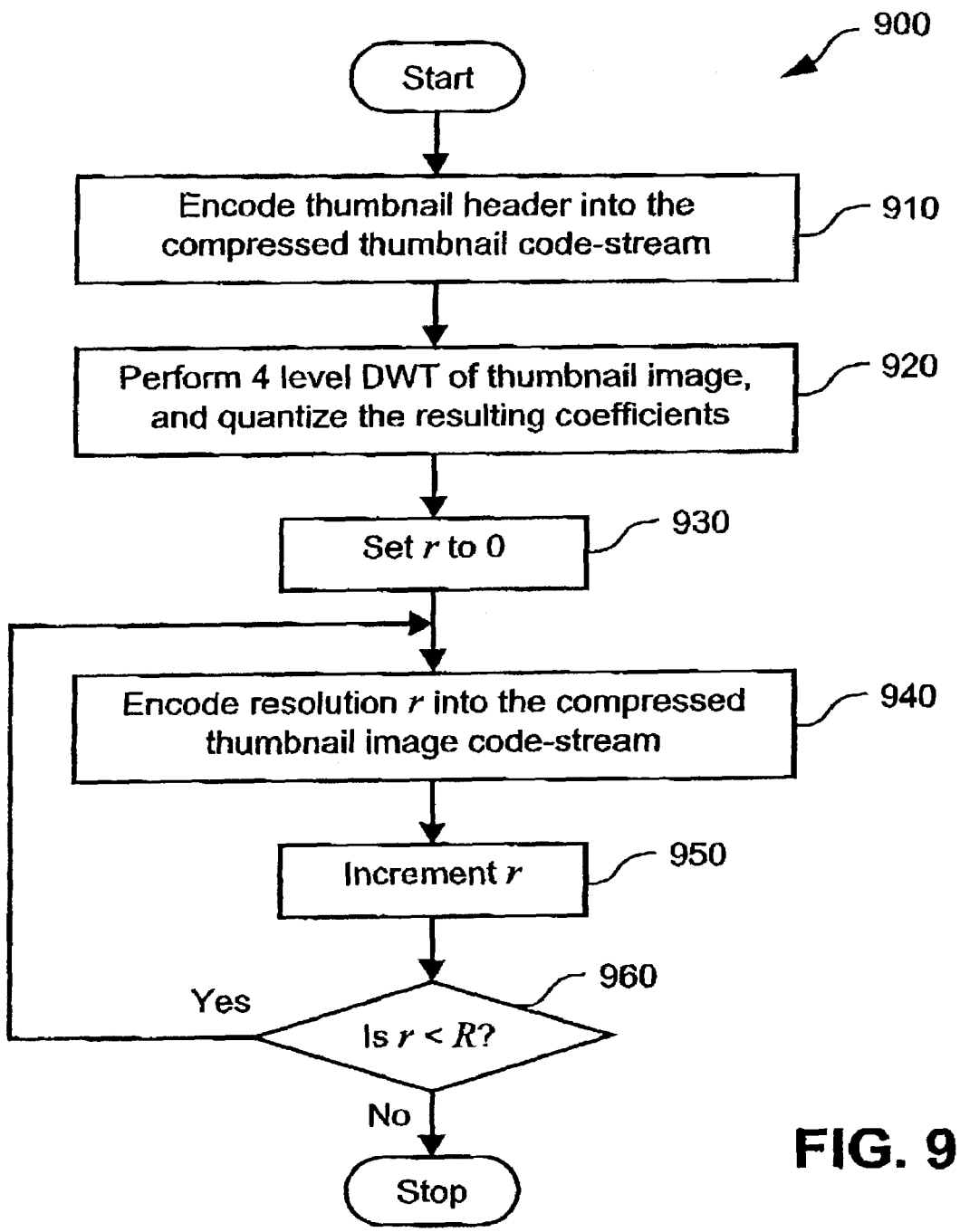
FIG. 9 is a flow diagram showing another method of encoding a thumbnail image into a primary compressed image code-stream, using a multi-resolution format.

FIG. 9 is a flow diagram showing another method 900 of encoding a thumbnail image into a primary compressed image code-stream, using a multi-resolution format. As performed at step 320 of the method 300, a resulting thumbnail code-stream is embedded in a primary compressed image code-stream stored in memory 1206. The thumbnail image is preferably of size 160×120 pixels and is encoded in the YCbCr colour space. The primary compressed image code-stream is preferably compressed using the JPEG2000 format with a multi-level Discrete Wavelet Transform (DWT). The thumbnail can be generated when doing the forward DWT of the primary image. In particular, the thumbnail is preferably formed by down-sampling the LL subband of the primary image to the desired 160×120 pixel size, as the LL subband of the primary image is being generated. The 160×120 thumbnail can be cached in memory 1206 as it is generated, for compression at a later stage. In this manner, the generation of the thumbnail is performed in conjunction with the compression of the primary image. Further, since the thumbnail is formed from the LL subband of the primary image, the processing required for the thumbnail is reduced as compared to forming the thumbnail directly from a corresponding full size primary image.

The method 900 is preferably implemented as software resident on the hard disk drive 1210 and being controlled in its execution by the processor 1205. The method 900 begins at the first step 910 where an image header is generated by the processor 1205 and encoded into a compressed image code-stream stored in memory 1206, preferably in accordance with the JPEG2000 standard. The header is encoded into the compressed image code-stream in resolution progressive mode. At the next step 920, the processor 1205 performs a discrete wavelet transform (DWT) on each component of the image, and each coefficient is quantized, according to the JPEG2000 standard. A 9×7 DWT filter set defined by JPEG2000 standard can be used to perform the DWT transform. The quantization step size for each subband can be selected as:

$$\Delta_b = \Delta \sqrt{\frac{1}{G_b}},$$

where $G_b$ represents the squared norm of the DWT synthesis basis vectors for subband b, $\Delta$ represents a base quantization step factors and $\Delta_b$ represents the quantization step factor for subband b. In the method 900 $\Delta \times \frac{1}{32}$. Alternatively other quantization step sizes, for example, weighted by visual considerations can be used. Further, the quantization can be effected by coding the image to a fixed size by truncating the code-streams for each code-block at a predetermined subpass, using a Lagrange multiplier rate control method as known to those in the relevant art.

The method 900 continues at the next step 930, where a resolution number r is initialized to zero. There are preferably four levels of DWT performed during step 920 resulting in five (i.e., R=5) resolution levels. At the next step 940, resolution r for each component is encoded into the compressed thumbnail code-stream, according to the JPEG2000 standard. For example, for r=0 the DC or LL4 subband the JPEG standard is encoded into the thumbnail code-stream. For r>0 the three AC subbands at resolution r, namely HL(5-r), LH(5-r) and HH(5-r), for a 4 level DWT, are encoded into the code-stream. Resolution r as used with respect to entropy coding and decoding is a differential resolution. For r>0, resolution r is the data required to go from resolution r−1 to resolution r, or for r=0 is simply resolution 0.

Accordingly, resolution r is preferably encoded in accordance with the resolution progressive mode of JPEG2000. As a result, substantially all of the data corresponding to resolution r is encoded into the code-stream before any data for resolution r+1.

The method 900 continues at the next step 950, where the processor 1205 increments resolution number r by one and a decision step 960 is entered. At step 960, the processor 1205 determines if the resolution number r is less than the number of resolutions R, where preferably R=5 (i.e., using 4 DWT levels). If resolution number r is less than R=5, at step 960 then the method 900 returns to step 940 and steps 940 to 960 are repeated with a current resolution number. If resolution number r is greater than or equal to R=5, at step 960, meaning that all of the resolutions have been encoded into the compressed thumbnail code-stream stored in memory 1206, then the method 900 concludes.

In an alternative arrangement of the method 900, resolution r can be encoded using R layers, where the first r layers are empty layers. The first layer (i.e., layer 1) for resolution 0 is constructed so that only 'layer 1' is decoded for resolution 0, and the image is decoded at resolution 0, giving a decoded image for display on the display 1214, for example. Layer 1 for the other resolutions is empty and layers 1 and 2 for resolution 0, and layer 2 for resolution 1 are sufficient for decoding an image at resolution 1 for display. Layer 2 for other resolutions are empty. Similarly layers 1, 2 and 3 for resolution 0, layers 2 and 3 for resolution 1, and layer 3 for resolution 2 are sufficient for decoding an image at resolution 2 for display, and so on.

A larger original (full size) thumbnail image (e.g. 320× to 240 pixels) can be encoded using the method 900. For a four level DWT, the DC resolution of such a thumbnail is the same size as the DC resolution of a 160×120 pixel thumbnail having the JPEG compatible multi-resolution format described herein Thus, a larger original thumbnail can be encoded with a DWT and a sufficient number of DWT levels, as described above, whilst still providing very small low resolution thumbnail decoding. Further, such a larger thumbnail image can also be used if there are only a few images to be displayed or as desired by the user. A larger number of DWT levels can be used substantially without processing cost to compress thumbnail images since the images are of a relatively small size. The same is not necessarily true for much larger images typically depending on hardware constraints. This is particularly true if thumbnail images are compressed using software running on a (possibly embedded) processor.

Figure 10:
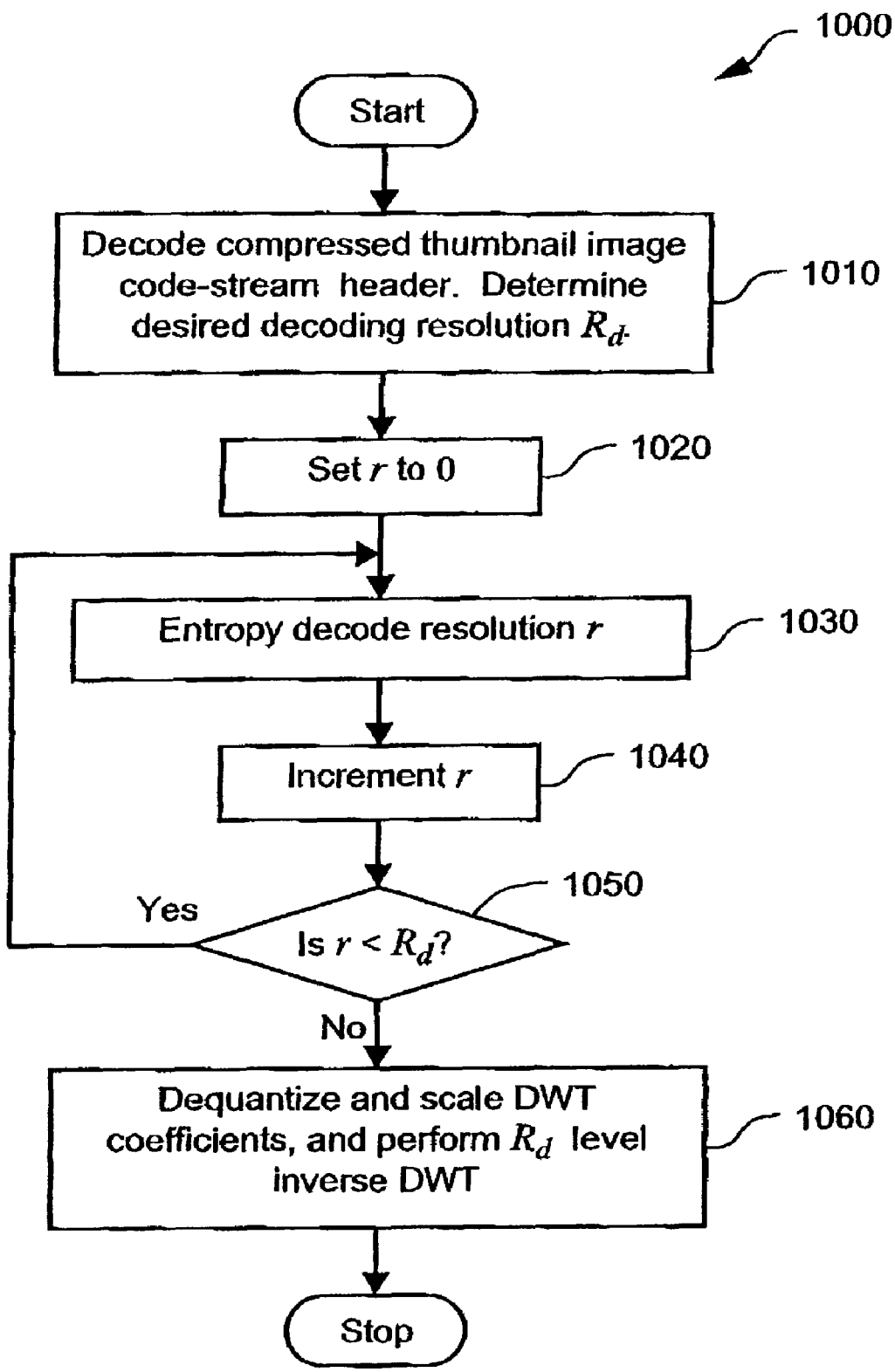
FIG. 10 is a flow diagram showing another method of decoding a multi-resolution thumbnail image embedded in a primary compressed image code-stream.

FIG. 10 is a flow diagram showing another method 1000 of decoding a multi-resolution thumbnail image embedded in a primary compressed image code-stream. The method 1000 can be utilised to decode thumbnail image data that has been embedded in a primary compressed image code-stream in accordance with the method 900. In the methods 1000, the resolutions for decoding are 0, 1, 2, 3, and 4 corresponding to a decoded image that is respectively $2^4$, $2^3$, $2^2$, $2^1$ and $2^0$ times smaller, in each dimension, than the full size encoded image. For example, a resolution $R_d=0$ corresponds to a decoded image with sixteen times fewer rows and sixteen times fewer columns as the original full size encoded image. The compressed thumbnail to be decoded using the method 1000 is preferably encoded in the YCbCr colour space, and there are thus three image components.

The method 1000 is preferably implemented as software resident on the hard disk drive 1210 and being controlled in its execution by the processor 1205. The method 1000 begins at step 1010 where the processor 1205 decodes the compressed thumbnail code-stream header stored in memory 1206 and determines a desired decoding resolution $R_d$. At the next step 1020, the resolution number r is set to 0. At the next step 1030, resolution r is decoded, by decoding all of the data for the given resolution. Alternatively in the decoding of resolution r, a number of least significant bit-planes, or sub-passes, can be skipped (i.e., not decoded) for each code-block. The number of least significant bit-planes can be determined based on a desired decoding quality for the given final resolution $R_d$. For example, for an image encoded according to the method 900 described above, 3, 3, 2, 1, and 0 bit-planes can be skipped respectively for $R_d=0$, 1, 2, 3, and 4. Such a bit-plane partition is suitable for the layering described above with respect to the the method 900. Layer 1 of resolution 0 consists of all but the last three bit-planes of resolution 0. Layer 2 of resolution 1 consists of all but the last 3 bit-planes of resolution 1. Layer 3 of resolution 2 consists of all but the last two bit-planes of resolution 2, and so on, Then Layer 2 of resolution 0 consists of bit-plane 2 (i.e., referring to the first bit-plane as bit-plane 0) for resolution 0. Similarly layer 3 of resolution 1 consists of bit-plane 2 for resolution 1. Similarly layer 4 of resolution 2 consists of bit-plane of 1 for resolution 2, and so on In one arrangement, for an image encoded according to the method 900 with layers as described above, only the $R_d+1$ most significant layers are decoded. In this instance, layers or bit-planes (i.e., sub-passes) are skipped in an effort to speed up decoding and hence display time for the image.

The method 1000 continues at the next step 1040, where the processor 1205 increments resolution number r. At the next step 1050, the processor 1205 determines if the current resolution number r is less than or equal to the desired decoding resolution $R_d$. If decision step 1050 returns a true, then the method 1000 returns to step 1030 with the current resolution number r. If the current resolution number r is greater than the desired decoding resolution $R_d$, at step 1050, the method 1000 proceeds to the next step 1060.

At step 1060, the decoded DWT coefficients are inverse quantized, scaled and then inverse transformed with an $R_d$ level inverse DWT. The scaling shift the DWT coefficients down (J–$R_d$) bit-planes, where J represents the number of DWT levels of the original compressed thumbnail image, and the shift is relative to that if a full J level inverse DWT was to be performed. Alternatively, the shift may be performed as part of the inverse DWT normalization. For example, if the DC subband at each stage of the inverse DWT is maintained at a nominal range of (–½, ½) then the data can be scaled up by 255 to give an 8-bit (integer) range.

The inverse transformed image components are preferably inverse transformed to the RGB colour space and then the resultant image displayed or buffered in memory 1206 for subsequent display on the display 1214, for example.

The methods 900 and 1000 utilise a compressed thumbnail image code-stream format substantially as represented in FIG. 1 with a resolution progressive JPEG2000 code-stream. However, for layering as described above, a layer progressive code-stream can also substantially conform to the format of FIG. 1, and thus can be used in alternative arrangements.

There are methods known that generate a thumbnail image for each image in a collection of images and store the thumbnails within a memory database. When a user is browsing the images, typically only the thumbnails are decoded and displayed. The thumbnails can be encoded in a format suitable for efficient multi-resolution decoding, and further the size of the thumbnail and its reduced resolution versions may be selected according to a given browsing application. However, such an approach suffers from the disadvantage that a database of (multi-resolution) thumbnails needs to be maintained separately from the compressed images. Further, the first time that a user browses a collection of images such a browsing application needs to generate the database.

Figure 11:
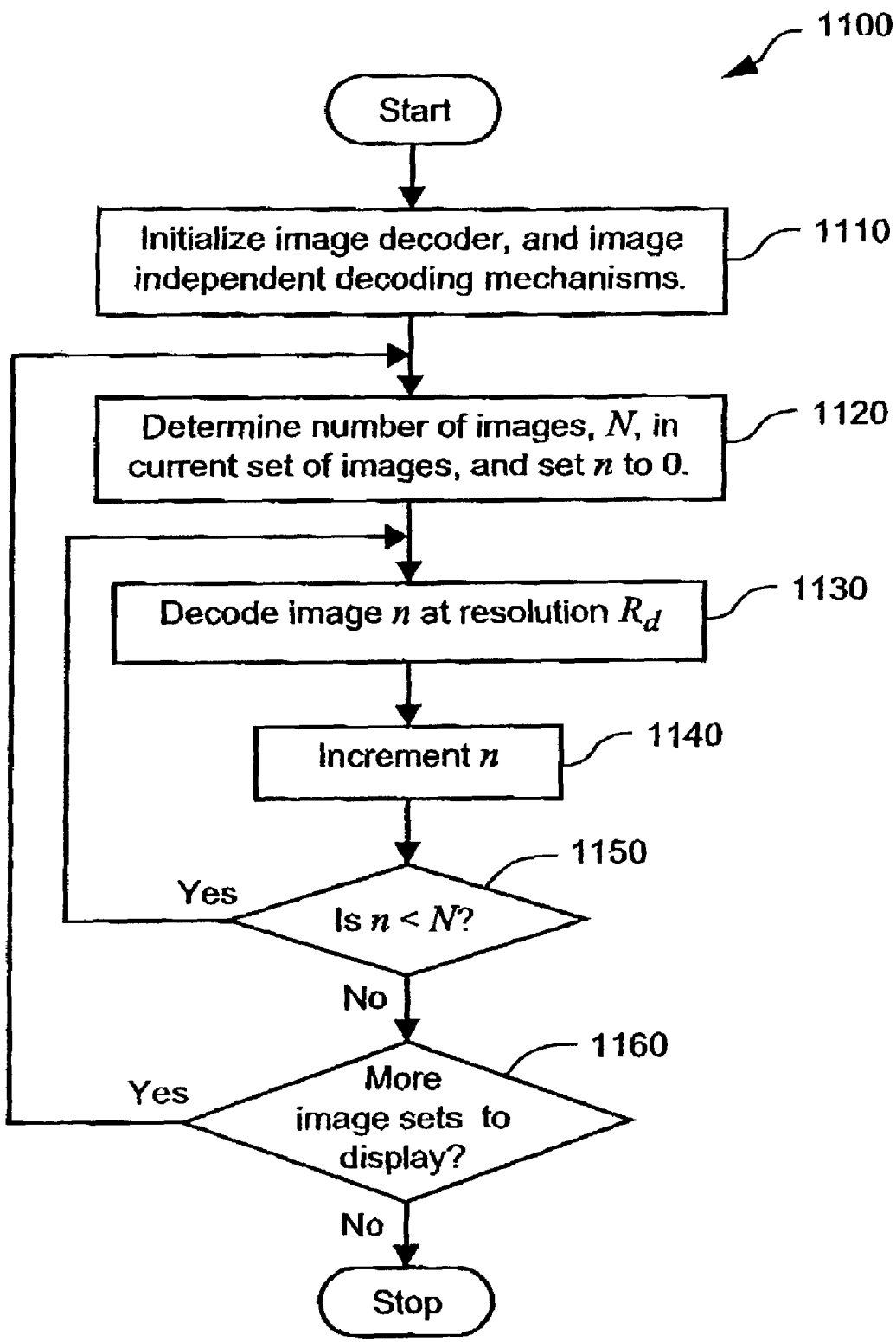
FIG. 11 is a flow diagram showing a method for decoding a set of thumbnail images.

FIG. 11 is a flow diagram showing a method 1100 for decoding a set of images. The method 1100 is preferably implemented as software resident on the hard disk drive 1210 and being controlled in its execution by the processor 1205. In one arrangement of the method 1100, the method 1100 can be implemented as one or more code modules of a software application for browsing digital images resident on the hard disk drive 1210, for example. Such an application can be used to display a thumbnail for each image of a currently selected directory, stored on the hard disk drive 1210. The method 1100 begins at step 1110, where the processor 1205 initializes mechanims for image decoding, For example, two 256 entry lookup tables stored on the hard disk drive 1210, for decoding fixed DC difference magnitude Huffman codes, along with other image independent decoding mechanisms, such as any lookup tables as used by a YCbCr to RGB transform, can be initialized, At the next step 1120, the number of images, N, in a currently selected directory is determined and an image index n is initialized to zero by the processor 1205. The method 1100 continues at the next step 1130, where image n of the current set of images is decoded at a decode resolution $R_d$. Decode resolution $R_d$ is preferably determined so that as many thumbnails as possible in the current set can be displayed on the display 1214 at once. For example, if the number of thumbnails in a current set, N, is small then a relatively high resolution is selected by the processor 1205, while if N is large then a relatively low decode resolution $R_d$ (e.g. $R_d=0$) is selected. Further, if there are too many thumbnails to fit on a display screen (e,g. the display 1214) even if $R_d=0$, then $R_d$ is preferably still set to zero.

The method 1100 continues at the next step 1140, where the processor 1205 increments the image index n. At the next step 1150, if n is less than N (i.e., there are more images in the current directory to decode) then the method 1100 returns to step 1130. Otherwise, the method 1100 continues at step 1160 where the processor 1205 determines if there are more image sets to display. Typically this test is true as long as the user is using the application implementing the method 1100. A user can select another directory for browsing at any stage in the method 1100. If decision block 1160 returns true then the method 1100 returns to step 1120 with a newly selected directory. Otherwise, the method 1100 concludes.

By using an efficient multi-resolution format for each thumbnail image as described above, the decode time for each thumbnail is substantially reduced for decoding at reduced resolution as compared to using a format that does not allow efficient multi-resolution decoding. In particular, compared to decoding at the full resolution and down-sizing to a reduced resolution, the decode time is substantially 4, 16, 64 etc times faster for decoding at 2, 4, 8, etc times smaller in each dimension respectively. Further, by performing the image independent initialization prior to the decoding of a set of images, as described above, the decode time for a set of images is reduced markedly over conventional arrangements, since such initialization is not performed for each image. The relative time reduction is significant for decoding thumbnails at low resolution (e.g. $R_d$=0). In this connection, fixed Huffman code decoding lookup tables are initialized, along with other image independent decoding mechanisms, such as any lookup tables as used by a YCbCr to RGB transform image independent memory allocation and initialization, and image independent pointer initialization. Still further, software for implementing the arrangements described above requires fewer function calls when decoding an image.

The method 1100 of FIG. 11 can be used to display a directory of compressed images each of which may contain a multiresolution format compressed thumbnail image. When decoding such a compressed image, the compressed thumbnail image is located within the compressed image and decoded at the appropriate desired resolution. An example of such a compressed image is a JPEG image containing compressed thumbnail images encoded in accordance with the method 500 of FIG. 5. Directories which contain such compressed images and corresponding thumbnail images encoded in accordance with the method 500, can be displayed very quickly substantially independently of the size of the original compressed thumbnails (or images), at least down to some minimum decode resolution (ie resolution 0). On the other hand, if an image does not contain a multi-resolution compressed thumbnail, either a standard thumbnail (if present) or the image itself can be decoded at the desired resolution using other, slower methods. Accordingly, each compressed image of a set of images in a directory preferably contains a multi-resolution format compressed thumbnail image, in order to ensure a fast display time for a set of such images, even when there are a large number of images in the set.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather than sequentially.

The foregoing describes only some embodiments of the present invention, and modifications and/or changes can be made thereto without departing from the scope and spirit of the invention, the embodiments being illustrative and not restrictive.

Appendix A

```
s = HUFF_DECODE;
if (s != 0)
{
    /* Determine exact difference, with the difference magnitude
    category s */
    r = GET_BITS(s);
    if (r < (1 << (s - 1)))
        s = -(1 << s) + r + 1;
    else
        s = r;
}
/* Convert DC difference to actual DC value, update last_dc_val */
s += last_dc_val;
last_dc_val = s;
/* Scale and output the DC coefficient */
dc_value = (s * q_value) >> 3;
```

Appendix B

```
if (GET_BITS(1)) == 0)
{
    dc_value = last_dc_val;
}
else
{
    s = GET_BITS(4) + 1;
    r = GET_BITS(s);
    if (r < (1 << (s - 1)))
        s = -(1 << s) + r + 1;
    else
        s = r;
    s += last_dc_val;
    last_dc_val = s;
    dc_value = s;
}
```

The claims defining the invention are as follows:

1. A method of encoding an image into an image code-stream, said method comprising the steps of:
   generating a reduced resolution representation of the image;
   encoding the reduced resolution representation in accordance with a multi-resolution format to form a multi-resolution encoded reduced resolution representation of the image, the multi-resolution encoded reduced resolution representation comprising data representing a plurality of resolutions of the reduced resolution representation;
   embedding said multi-resolution encoded reduced resolution representation into a first portion of the image code-stream, wherein each resolution of the reduced resolution representation is represented by a contiguous segment of the first portion of the image code-stream; and
   encoding a compressed representation of the image into a further portion of the image code-stream.

2. The method according to claim 1, wherein the image code-stream substantially conforms with any one of the EXIF file format, the JPEG standard format, and the JPEG2000 standard format.

3. The method according to claim 1, wherein the multi-resolution encoded reduced resolution representation substantially conforms with any one of a spectral selection mode of the JPEG standard format and the JPEG 2000 standard format.

4. A method of decoding a reduced resolution representation of an image, the reduced resolution representation being embedded in an image code-stream as a multi-resolution encoded reduced resolution representation in a multiresolution format, the multi-resolution encoded reduced resolution representation comprising data representing a plurality of resolutions of the reduced resolution representation, said method comprising the steps of:

determining a resolution for decoding the multi-resolution encoded reduced resolution representation;

determining a location of the multi-resolution encoded reduced resolution representation within said image code-stream, wherein each resolution of the reduced resolution representation within the multi-resolution encoded reduced resolution representation is represented by a contiguous segment of the image code-stream; and decoding at least one of the continuous segments of data at the location in accordance with the decoding resolution.

5. The method according to claim 4, wherein said image code-stream substantially conforms with any one of the JPEG standard format, the JPEG 2000 standard format, and the EXIF file format.

6. The method according to claim 4, wherein the multi-resolution encoded reduced resolution representation substantially conforms with any one of a spectral selection mode of the JPEG standard format and the JPEG2000 standard format.

7. An apparatus for encoding an image into an image code-stream, said apparatus comprising:

generating means for generating a reduced resolution representation of said image;

first encoding means for encoding the reduced resolution representation in accordance with a multi-resolution format to form a multi-resolution encoded reduced resolution representation of the image, the multi-resolution encoded reduced resolution representation comprising data representing a plurality of resolutions of the reduced resolution representation;

embedding means for embedding the multi-resolution encoded reduced resolution representation into a first portion of the image code-stream, wherein each resolution of the reduced resolution representation is represented by a contiguous seamen of the first portion of the image code-stream; and second encoding means for encoding a compressed representation of said image into a further portion of the image code-stream.

8. An apparatus for decoding a reduced resolution representation of an image, the reduced resolution representation being embedded in an image code-stream as a multi-resolution encoded reduced resolution representation in a multi-resolution format, the multi-resolution encoded reduced resolution representation comprising data representing a plurality of resolutions of the reduced resolution representation, said apparatus comprising:

processor means for determining a resolution for decoding the multi-resolution encoded reduced resolution representation, and determining a location of the multiresolution encoded reduced resolution representation within the image code-stream, wherein each resolution of the reduced resolution representation within the multi-resolution encoded reduced resolution representation is represented by a contiguous segment of the image code-stream; and decoding means for decoding at least one of the contiguous segments of data at the location in accordance with the decoding resolution.

9. A computer-readable storage medium storing a program which, when executed, performs a method for encoding an image into an image code-stream, said program comprising:

code for generating a reduced resolution representation of the image;

code for encoding the reduced resolution representation in accordance with a multi-resolution format to form a multi-resolution encoded reduced resolution representation of the image, the multi-resolution encoded reduced resolution representation comprising data representing a plurality of resolutions of the reduced resolution representation;

code for embedding the multi-resolution encoded reduced resolution representation into a first portion of the image code-stream, wherein each resolution of the reduced resolution representation is represented by a contiguous segment of the first portion of the image code-stream; and code for encoding a compressed representation of said image into a further portion of said image code-stream.

10. A computer-readable medium storing a program which, when executed, performs a method for decoding a reduced resolution representation of an image, the reduced resolution representation being embedded in an image code-stream as a multi-resolution encoded reduced resolution representation in a multi-resolution format, the multi-resolution encoded reduced resolution representation comprising data representing a plurality of resolutions of the reduced resolution representation, said program comprising:

code for determining a resolution for decoding said multi-resolution encoded reduced resolution representation;

code for determining a location of said multi-resolution encoded reduced resolution representation within the image code-stream, wherein each resolution of the reduced resolution representation within the multi-resolution encoded reduced resolution representation is represented by a contiguous segment of the image code-stream; and code for decoding at least one of the continuous segments of data multi-resolution at the location in accordance with the decoding resolution.

* * * * *